US010577185B2

(12) United States Patent
Andreoli

(10) Patent No.: US 10,577,185 B2
(45) Date of Patent: Mar. 3, 2020

(54) GUIDE STRUCTURE FOR CHAINS FOR AN ARTICLE CONVEYER

(71) Applicant: REXNORD FLATTOP EUROPE S.R.L., Correggio (RE) (IT)

(72) Inventor: Andrea Andreoli, Modena (IT)

(73) Assignee: REXNORD FLATTOP EUROPE S.R.L., Correggio (RE) (IT)

( * ) Notice: Subject to any disclaimer, the term of this patent is extended or adjusted under 35 U.S.C. 154(b) by 0 days.

(21) Appl. No.: 16/253,758

(22) Filed: Jan. 22, 2019

(65) Prior Publication Data
US 2019/0225426 A1 Jul. 25, 2019

(30) Foreign Application Priority Data
Jan. 22, 2018 (IT) .................. 102018000001634

(51) Int. Cl.
| B65G 21/22 | (2006.01) |
| B65G 17/08 | (2006.01) |
| B65G 21/10 | (2006.01) |
| B65G 21/20 | (2006.01) |

(52) U.S. Cl.
CPC ............ *B65G 21/22* (2013.01); *B65G 17/08* (2013.01); *B65G 21/10* (2013.01); *B65G 21/2009* (2013.01); *B65G 2812/02019* (2013.01)

(58) Field of Classification Search
CPC ........ B65G 17/08; B65G 21/10; B65G 21/22; B65G 21/2009
USPC .......................................................... 198/841
See application file for complete search history.

(56) References Cited

U.S. PATENT DOCUMENTS

| 4,720,008 A * | 1/1988 | Ufland .................. B65G 21/00 198/813 |
| 5,310,047 A | 5/1994 | Ledingham | |
| 6,964,333 B2 * | 11/2005 | Ledingham ............ B65G 21/06 198/836.3 |
| 7,131,531 B1 * | 11/2006 | Ryan ..................... B65G 15/60 198/842 |

(Continued)

FOREIGN PATENT DOCUMENTS

| EP | 1 593 618 A1 | 11/2005 |
| WO | 2016/131879 A1 | 8/2016 |

OTHER PUBLICATIONS

Search Report dated Oct. 10, 2018 in connection with IT Patent Application 102018000001634.

*Primary Examiner* — Douglas A Hess
(74) *Attorney, Agent, or Firm* — Quarles & Brady LLP

(57) ABSTRACT

A guide structure for a chain for an article conveyor is disclosed. The guide structure includes a guide for guiding the chain along a direction of movement of the chain and having at least two rails each delimiting a respective guide channel for at least partly accommodating the chain. An accompanying means for supporting the chain and accompanying it into the guide channel, wherein the accompanying means comprises a contact surface adapted to be in contact with the chain while the chain is accompanied into the guide channel. A fixing means for keeping the accompanying means in fixed position with respect to the guide. And, an adjusting means for adjusting a position of the accompanying means generally orthogonal to the direction of movement of the chain to adjust the angular position of the accompanying means with respect to the guide in at least a first and a second angular positions.

20 Claims, 19 Drawing Sheets

(56) References Cited

U.S. PATENT DOCUMENTS 9,598,244 B2\* 3/2017 Snabb .................... B65G 15/62
10,077,156 B2\* 9/2018 Fourney ................. B65G 23/06

\* cited by examiner

GUIDE STRUCTURE FOR CHAINS FOR AN ARTICLE CONVEYER

CROSS-REFERENCE TO RELATED APPLICATION

This application claims priority under 35 U.S.C. 119 to Italian Patent Application No. 102018000001634 filed on Jan. 22, 2018, the entire contents of which are incorporated herein by reference.

FIELD OF THE INVENTION

The present invention relates to a guide structure for guiding one or more chains of an article conveyor.

PRIOR-ART DISCUSSION

An article conveyor typically comprises a movable closed-loop support element adapted to support the articles to be conveyed, and drive elements (for example, electric motors, pinions and cogwheels) for moving the support element along a predefined path (thereby allowing the articles supported thereon to be conveyed).

A common type of conveyor makes use of one or more chains as support element, which typically is configured in such a way to flex/bend upward and downward (for example, so as to be moved around pinions and cogwheels), and to curve rightward and leftward along a conveying path.

Along specific sections of the conveying path, such as in return sections of the conveying path (for example, in curve), the article conveyors are typically provided with forward and/or return guide structures for guiding the chain/chains in a fluid and stable manner. Each guide structure typically comprises one or more guide channels, each guide channel being intended to guide a respective chain.

Conventional guide structures may comprise accompanying means to promote an input of the chain into the guide channel (and/or accompanying means to promote an output of the chain from the guide channel).

WO2016131879 discloses an idle roller positioned in proximity of an inlet of the guide channel at such a distance (along a vertical direction) from the guide channel that the chain, by sliding on the roller, is substantially aligned with the inlet of the guide channel. WO2016131879 also discloses vertical elongated opening at respective opposite side walls of a guide structure carter for adjusting the position of the roller along the vertical direction so as to be adapted to chains having different thicknesses.

SUMMARY OF THE INVENTION

The Applicant has noticed that the known solutions of guide structures cannot be easily and cheaply adapted to chains having different thicknesses.

Considering for example WO2016131879, the Applicant has found that the vertical elongated openings at respective opposite side walls of the guide structure carter for adjusting the position of the roller along the vertical direction involve complex and costly machining. In fact, in order to manufacture the vertical elongated openings, the solution of WO2016131879 requires multiple petitioning and complex machining at both side walls of the guide structure carter.

Moreover, adjusting the position of the roller along the vertical direction determines long times and requires too many operators. In fact, at least two operators are required for adjusting the position of the roller at respective sides of the guide structure carter, and a third operator is recommended in order to check whether the adjustment of the roller is correct (especially considering unavoidable mechanical tolerances of the elongated vertical openings) and to instruct the other operators in respect of actions to be taken in order to compensate for possible misalignments.

Last but not least, the chain thicknesses that are admitted by the solution disclosed in WO2016131879 strongly depend on the length of the vertical elongated openings. Since machining complexity and costs increase as the length of the vertical elongated openings increases, then conventional guide structures make use of vertical elongated openings with reduced lengths, whereby the conventional guide structures are not adapted to accompany into the guide channel chains having wide thickness ranges.

The Applicant has devised a solution of guide structures for chains for article conveyors able to overcome the above-mentioned, as well as other, issues.

In particular, one or more aspects of the present invention are indicated in the independent claims, with advantageous features of the same invention that are indicated in the dependent claims, whose text is incorporated herein verbatim by reference.

More specifically, an aspect of the present invention proposes a guide structure for a chain for an article conveyor, in particular according to claim 1. The guide structure comprises a guide for guiding the chain along a first direction being a direction of movement of the chain; the guide has a first surface that, in use, faces the chain, and a second surface opposite the first surface. The guide comprises at least two rails each one extending, along a second direction orthogonal to the first direction, from the first surface to a third surface between the first and second surfaces, each pair of rails delimiting, along a third direction orthogonal to the first and second directions, a respective guide channel for at least partly accommodating the chain. The guide structure further comprises accompanying means for supporting the chain and accompanying it into the guide channel; the accompanying means comprises a contact surface adapted to be in contact with the chain while the chain is accompanied into the guide channel. The guide structure also comprises fixing means for keeping the accompanying means in fixed position with respect to the guide, and adjusting means for adjusting a position of the accompanying means along the second direction. The adjusting means is adapted to adjust the angular position of the accompanying means with respect to the guide in at least a first and a second angular positions, wherein in the first angular position the minimum distance of the contact surface from the first surface along the second direction has a first distance value, and in the second angular position the minimum distance of the contact surface from the first surface along the second direction has a second distance value, the second distance value being different from the first distance value. The fixing means keep the accompanying means in the adjusted angular position.

According to an embodiment of the present invention, the contact surface has a rounded profile.

According to an embodiment of the present invention, the accompanying means comprises a further contact surface opposite to said contact surface. The accompanying means can preferably be arranged in a first mounting configuration in which the contact surface faces, in operation, the chain or a in second mounting configuration in which the further contact surface faces, in operation, the chain.

According to an embodiment of the present invention, the further contact surface has a rounded profile.

According to an embodiment of the present invention, the contact surface and the further contact surface define a substantially pear shaped cam profile of the accompanying means.

According to an embodiment of the present invention, the accompanying means is rotatable about a rotation axis parallel to the third direction. Preferably, the rotation axis has, along the second direction, a first distance from the contact surface and a second distance from the further contact surface, the first distance being advantageously different from the second distance whereby, when the accompanying means is arranged in the second mounting configuration, the rotation of the accompanying means between said first and second angular positions determines, respectively, first and second further distances values of the minimum distance between the further contact surface and the first surface along the second direction. More preferably, the first and second further distance values are different from the first and second distance values, respectively.

According to an embodiment of the present invention, the accompanying means comprises a cylinder. Preferably, the accompanying means is rotatable between the first and second angular positions by rotation of the cylinder about an eccentric rotation axis being eccentric compared the cylinder axis.

According to an embodiment of the present invention, the guide structure further comprises a protective casing having two opposite side walls within which the guide is provided. Preferably, the adjusting means comprises a pair of circular through holes each one formed at a respective wall of the protective casing.

BRIEF DESCRIPTION OF THE FIGURES

One or more embodiments of the present invention, as well as further features and the related advantages, will be better understood with reference to the following detailed description, given purely by way of non-limitative example only, to be read in conjunction with the accompanying figures (wherein corresponding elements are indicated with the same or similar references and their explanation is not repeated for the sake of brevity). In particular.

DESCRIPTION OF EMBODIMENTS OF THE INVENTION

With references to the drawings, guides structures for an article conveyor are shown.

In the following, directional terminology (for example, top, bottom, upper, lower, side, central, longitudinal, transverse, vertical) associated with the guide structures and components thereof will be used in relation to the intended orientation of use (i.e., the orientation upon installation and operation of an article conveyor comprising such guide structures).

The article conveyor, not shown in its entirety, typically comprises one or more movable chains, briefly discussed later on by referring only to functional elements deemed relevant for the understanding of the present invention, drive elements (for example, electric motors, pinions and cogwheels, not shown) for moving/driving the chain(s) along a predefined conveyor path (i.e. along a respective forward—for example, upper—section that allows the articles to be conveyed, and/or along a respective return for example, lower—section), and a guide structure for guiding the chain(s) along said conveyor path.

Figure 1A:
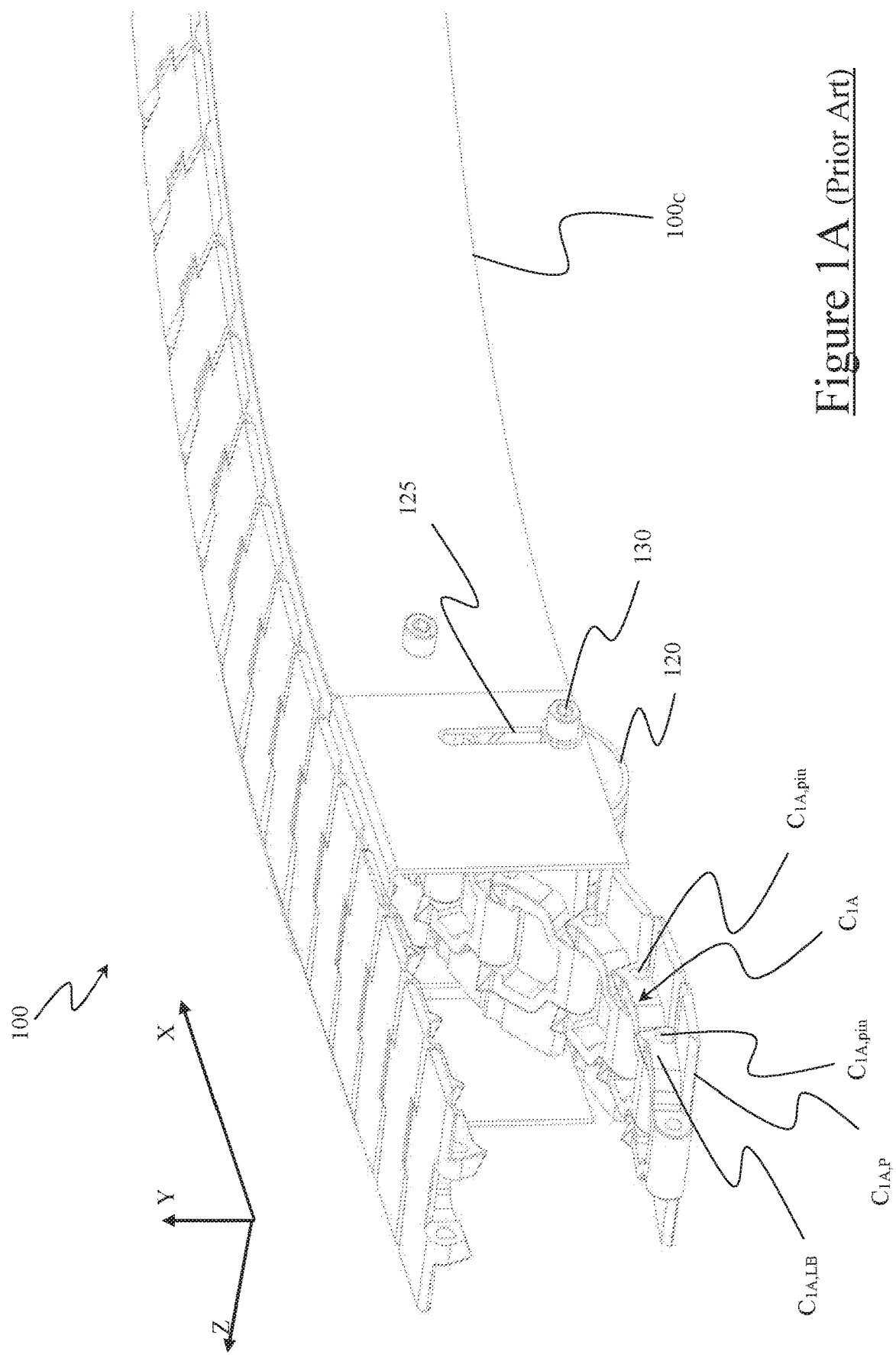
FIGS. 1A, 1B and 1C show perspective views of a known guide structure for an article conveyor, with chains having different thicknesses.
Figure 1B:
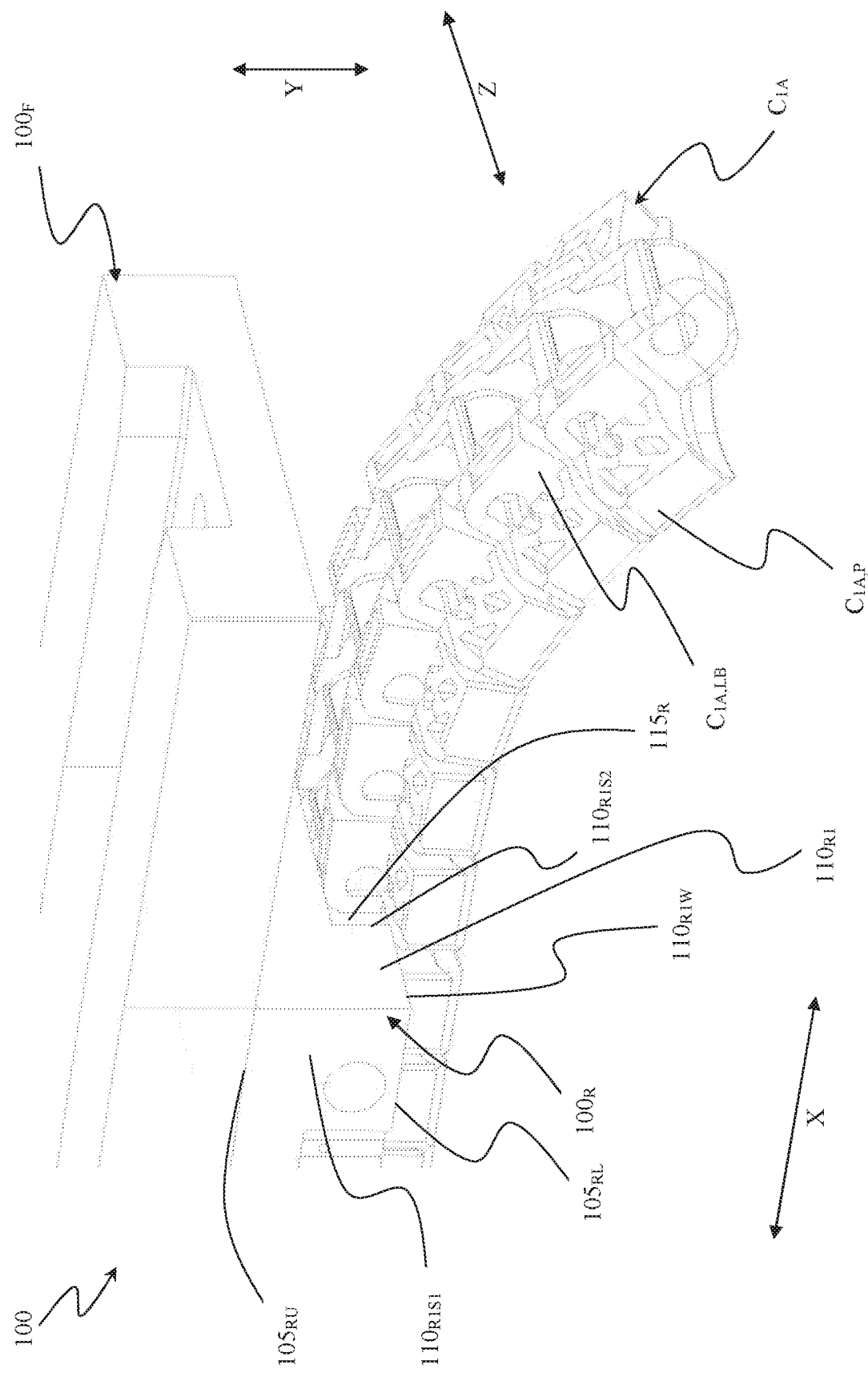
Figure 1C:
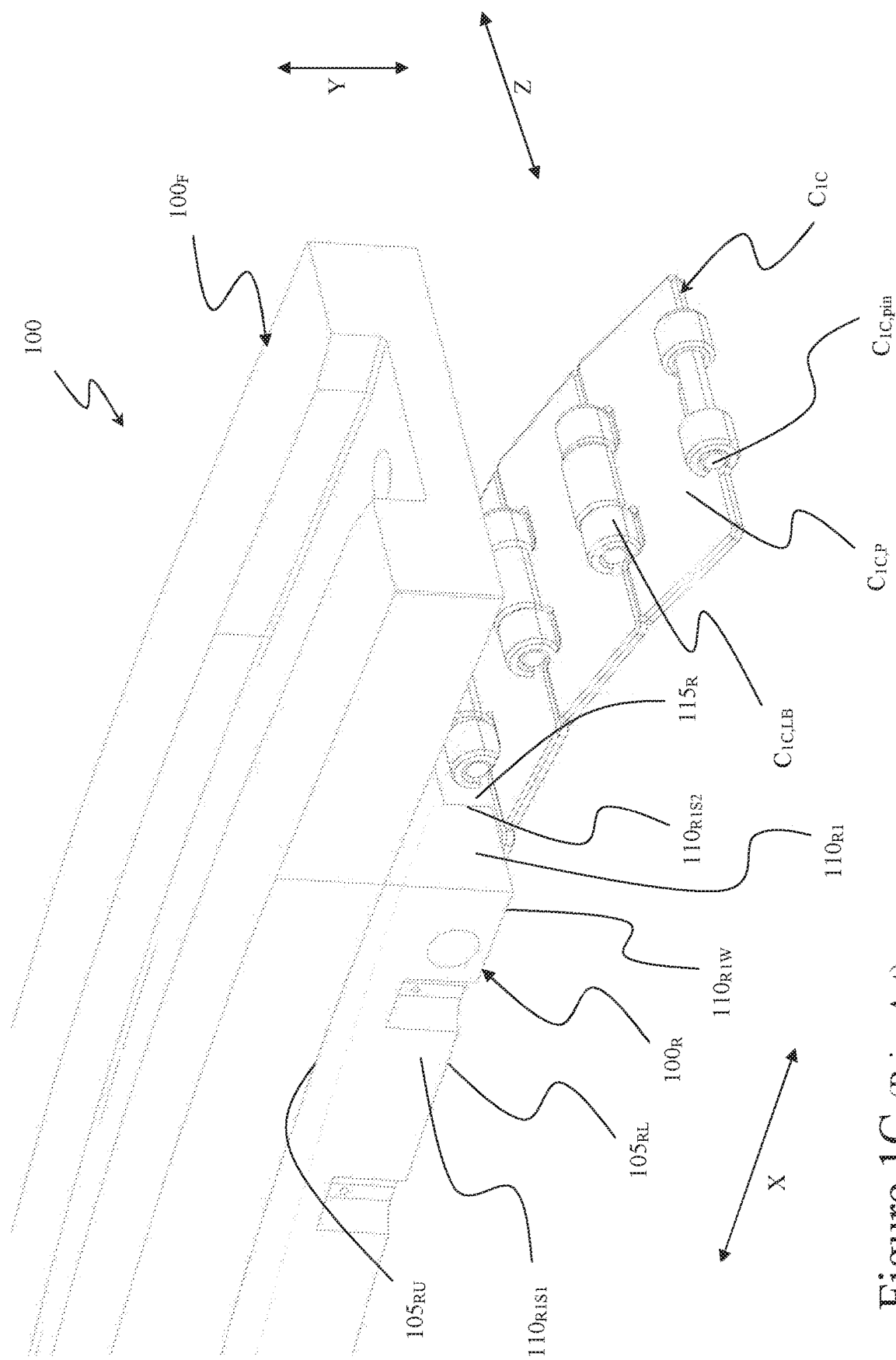

With reference to the drawings, FIGS. 1A, 1B and 1C show perspective views of a known guide structure 100 for an article conveyor, with chains having different thicknesses (in the example at issue, the chain illustrated in FIGS. 1A and 1B, denoted by $C_{1A}$, has a higher thickness than the chain illustrated in FIG. 1C, denoted by $C_{1C}$). The chains $C_{1A}$, $C_{1C}$ are not part of the guide structure 100, however their representation, and particularly the representation of chains having different thicknesses, in these figures is functional to the understanding of the technical problem affecting the known guide structure 100.

For the purposes of the present description, each chain $C_{1A}$, $C_{1C}$ comprises a plurality of links each one identifying a rest/support surface (an upper surface, taking as reference the forward section) for the articles to be conveyed, with the rest surfaces of the links that, in the forward section, define as a whole a rest plane of the chain $C_{1A}$,$C_{1C}$. As exemplary illustrated, each link of the chain $C_{1A}$,$C_{1C}$ may for example comprise a first link part or element (in the illustrated example, a plate) $C_{1A,P}$,$C_{1C,P}$ for supporting the articles to be conveyed and a second link part or element (in the illustrated example, a link body) $C_{1A,LB}$,$C_{1C,LB}$ for supporting the plate $C_{1A,P}$,$C_{1C,P}$.

In the illustrated example, the guide structure 100 comprises a protective casing (carter) $100_C$, inside which a forward guide $100_F$ for guiding the chain $C_{1A},C_{1C}$, in a longitudinal direction X (i.e. a direction of movement of the chain $C_{1A},C_{1C}$), along at least a portion of the forward section of the conveyor path, and a return guide $100_R$ for guiding the chain $C_{1A},C_{1C}$, in the longitudinal direction X, along at least a portion of the return section of the conveyor path, are provided. In the illustrated example, the forward guide $100_F$ and the return guide $100_R$ are fastened to each another (e.g., in a reversible manner), with the forward $100_F$ and return $100_R$ guides that preferably identify, in operation, top and bottom guides, respectively, of the guide structure 100.

However, as will be appreciated in the following while discussing embodiments of the present invention, the present invention equivalently applies to guide structures having no forward guide, in that the issues which the present invention is intended to address mainly affect the return guides. For this reason, only the return guide $100_R$ will be deeply discussed in the following (with some elements of the forward guide $100_F$ that will be introduced and discussed only when relevant).

The return guide $100_R$ comprises a surface $105_{RL}$ that, in use, faces (and preferably contacts) the chain $C_{1A},C_{1C}$ and is oriented downwards, thus referred to as lower surface hereinafter, and a surface $105_{RU}$, opposite the lower surface $105_{RL}$, that, in use, is oriented upwards, thus referred to as upper surface hereinafter, and faces the forward guide $100_R$ (e.g., as illustrated, a lower surface thereof), when a forward guide is provided.

The return guide $100_R$ preferably comprises a number I of rails (i=1, ..., with I≥2), each one extending, along n vertical direction Y orthogonal to the longitudinal direction X, from the lower surface $105_{RL}$ of the return guide $100_R$ downwards, and, along a transversal direction Z orthogonal to the longitudinal X and vertical Y directions, parallel to each other. Each pair of rails delimits, along the transversal direction Z, a number J of guide channels (j=1, ..., J, with J=I−1) each one for receiving or accommodating a respective chain $C_{1A},C_{1C}$ or a portion (preferably a lower portion) thereof, thereby allowing each chain $C_{1A},C_{1C}$ to be guided along the return section of the conveyor path.

In the example at issue, two rails $110_{R1},110_{R2}$ are provided (the rail $110_{R2}$ being not visible), which delimit one guide channel 115R (i.e. a return guide channel, as opposed to a forward guide channel provided in the forward guide $100_F$), the return guide $100_R$ thus identifying a single-channel return guide. In any case, as will be understood from the following discussion, the present invention is not limited to a specific number of guide channels—for example, the present invention equivalently applies to a return guide formed as a multi-channel return guide for moving multiple parallel chains.

In the considered example, each rail $110_{R1},110_{R2}$ comprises a respective lower wall $110_{R1W},110_{R2W}$ parallel to the upper $105_{RU}$ and lower $105_{RF}$ surfaces of the return guide $110_R$, and respective vertical side walls $110_{R1S1},110_{R1S2}$ and $110_{R2S1},110_{R2S2}$ (the vertical side walls $110_{R2S1},110_{R2S2}$ being not visible) extending, along the vertical direction Y, from opposite side ends of the respective lower wall $110_{R1W}$, $110_{R2W}$, to the lower surface $105_{RL}$. The lower walls $110_{R1W}$, $110_{R2W}$ of the rails $110_{R1},110_{R2}$ thus identify, as a whole, a lowermost surface of the return guide $100_R$. The vertical side walls (of the rails $110_{R1},110_{R2}$) facing each other delimit the guide channel $115_R$ (in the example at issue of single channel, the vertical side wall $110_{R1S2}$ of rail $110_{R1}$ and the vertical side wall $110_{R2S1}$ of rail $110_{R2}$ delimit the guide channel $115_R$).

As illustrated, the guide channel $115_R$ is adapted to slidably receive within it a portion of the chain $C_{1A},C_{1C}$ (e.g., the link body $C_{1A,LB},C_{1C,LB}$ thereof), with the lower walls $110_{R1W},110_{R2W}$ of the rails $110_{R1},110_{R2}$ that face the chain $C_{1A},C_{1C}$ and preferably form a slide abutment for another portion of the chain $C_{1A},C_{1C}$ (e.g., the plate $C_{1A,P}$, $C_{1C,P}$ thereof). In order to achieve that, in the considered example, the guide structure 100 comprises magnetic interaction means adapted in use to magnetically interact with magnetic interaction means of the chain $C_{1A},C_{1C}$ to cause a magnetic attraction of the chain $C_{1A},C_{1C}$ within the guide channel $115_R$ (i.e., substantially along the vertical direction Y). The magnetic interaction means of the guide structure 100 may comprise one or more magnetic field generation elements (for example, electromagnets or permanent magnets—in the following, magnets), not shown, whereas the magnetic interaction means of the chain $C_{1A},C_{1C}$ may comprise one or more elements of the chain $C_{1A},C_{1C}$ (such as, just as an example, coupling pins $C_{1A,Pin}$, $C_{1C,Pin}$ intended to couple links of each chain $C_{1A},C_{1C}$ to each other) made in ferritic steel or other ferromagnetic material so as to be responsive to the magnetic fields. The magnet may be arranged in the return guide $110_R$ and/or in the forward guide $110_F$ (when provided). For example, the magnets may be arranged in appropriate seats (not shown) of the return guide $110_R$, and may be disposed above the guide channel $115_R$ (so as to determine the magnetic attraction of the chain $C_{1A},C_{1C}$ to the return guide channel $115_R$, and, to a certain extent, to the forward guide channel).

However, as will be appreciated in the following while discussing embodiments of the present invention, the present invention may equivalently be applied to guide structures having no magnets, in that the issues which the present invention is intended to address generally affect any guide structure requiring accompanying means for accompanying the movement of the chain with respect to the guide channel. Therefore any guide structure in which accompanying means to promote an input of the chain into the guide channel (and/or accompanying means to promote an output of the chain from the guide channel) are required, may benefit from the present invention. By way of example only, known guide structures (not shown) provided with grooves (along the vertical side walls delimiting the guide channel) for accommodating the chain within the guide channel and supporting it from below (hence, without any magnet) may also benefit from the present invention.

As visible in FIG. 1A, the guide structure 100 further comprises accompanying means for supporting the chain $C_{1A},C_{1C}$ and accompanying it into the guide channel $115_R$. The accompanying means is in the form of an idle roller 120 positioned in proximity of the inlet of the guide channel 115R at such a distance (along the vertical direction Y) from the lowermost surface of the guide channel 115R (hereinafter referred to as vertical distance, or vertical distance from the guide channel $115_R$) that the chain $C_{1A},C_{1C}$, by sliding on the roller 120, is substantially aligned with the inlet of the guide channel 115R, and sufficiently close to the magnets to be effectively intercepted by the field lines of the magnetic field generated by them. Once entered the guide channel $115_R$, the magnetic interaction between the chain $C_{1A},C_{1C}$ and the magnets causes the attraction of the chain $C_{1A},C_{1C}$ toward, and retention of the chain $C_{1A},C_{1C}$ at the lower surface $105_{RL}$ of the guide channel $115_R$ (which is actually the guide channel top) thereby allowing the guided sliding of the chain $C_{1A}, C_{1C}$ within the guide channel $115_R$ (i.e., at the inlet thereof).

As visible in FIG. 1A, adjusting means is also provided for adjusting the position of the roller 120 (i.e., of a contact surface thereof intended in use to be in contact with the chain $C_{1A}, C_{1C}$ while the chain $C_{1A}, C_{1C}$ is accompanied into the guide channel $115_R$) with respect to the guide channel $115_R$. Particularly, the vertical distance of the roller 120 is adjustable (along the vertical direction Y) according to the size of the chain $C_{1A}, C_{1C}$ (e.g., the thickness of the plates $C_{1A,P}, C_{1C,P}$). In this regard, the adjusting means comprises two elongated vertical openings or slots 125 at respective opposite side walls of the carter $100_C$, so that the roller 120 can vertically slide along the openings 125, and be fixed (and kept) in the desired position—for example, by bolts 130 or other fixing means.

The adjustment of the vertical distance of the rollers 120 from the guide channel $115_R$ allows the guide structure 100 to be adapted to chains (with plates) having different thicknesses. In the illustrated example, the vertical distance of the roller 120 from the guide channel $115_R$ can be adjusted from a maximum value (corresponding to the positioning of the roller 120 at the lower end of the opening 125, as visible in FIG. 1A) allowing the roller 120 to support and accompany a chain having a relatively high thickness, such as the chain $C_{1A}$, to a minimum value (corresponding to the positioning of the roller 120 at the upper end of the openings 125, positioning not shown) allowing the roller 120 to support and accompany a chain with a lower thickness, such as the chain $C_{1C}$.

The Applicant has understood that the vertical elongated openings 125 involve complex and costly machining. In fact, in order to manufacture the vertical elongated openings 125 multiple positioning and complex machining at both side walls of the carter $100_C$ are required. Moreover, adjusting the position of the roller 120 along the vertical direction Y determines long times and requires too many operators (in fact, at least two operators are required for adjusting the vertical position of the roller 120, i.e. each operator at a respective side, and a third operator is recommended in order to check whether the adjustment of the roller 120 is correct and to instruct the other operators in respect of actions to be taken in order to compensate tor possible misalignments). Last but not least, the chain thicknesses that are admitted by the guide structure 100 strongly depend on the length of the vertical elongated openings 125. Since machining complexity and costs increase as the length of the vertical elongated openings 125 increases, then the guide structure 100 is recommended to be provided with vertical elongated openings 125 with reduced lengths, whereby the guide structure 100 is not adapted to accompany into the guide channel $115_R$ chains having wide thickness ranges.

According to the principles of the present invention, the adjusting means is adapted to adjust the angular position of the accompanying means with respect to the guide channel in at least a first and a second angular positions, such that in the first angular position the minimum vertical distance of the contact surface from the guide channel has a first distance value, and in the second angular position the minimum vertical distance of the contact surface from the guide channel has a second distance value different from the first distance value, with the accompanying means that are kept in the adjusted angular position by the fixing means.

As will be understood from the following discussion, the specific shape or profile of the accompanying means is not limitative for the present invention. Therefore, although in the following discussion explicit reference will be made to exemplary and advantageous shapes or profiles of the accompanying means, the principles of the present invention equivalently apply when the accompanying means is embodied as a shoe (e.g., a wedge-shaped a cam-shaped shoe), a ramp, a cylinder, or the like.

Figure 2A:
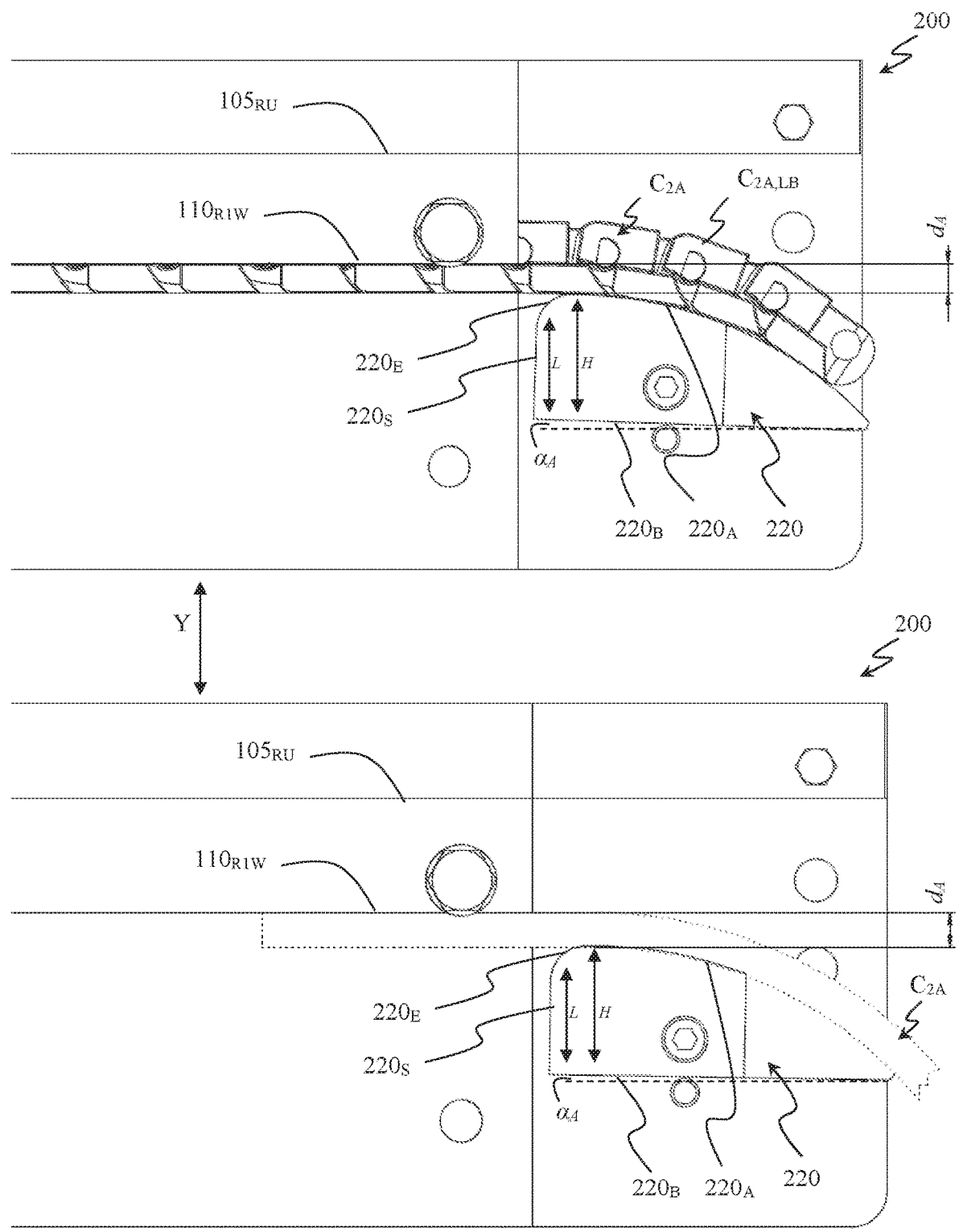
FIGS. 2A, 2B and 2C show side views of a guide structure according to an embodiment of the present invention, in respective angular positions of accompanying means thereof.
Figure 2B:
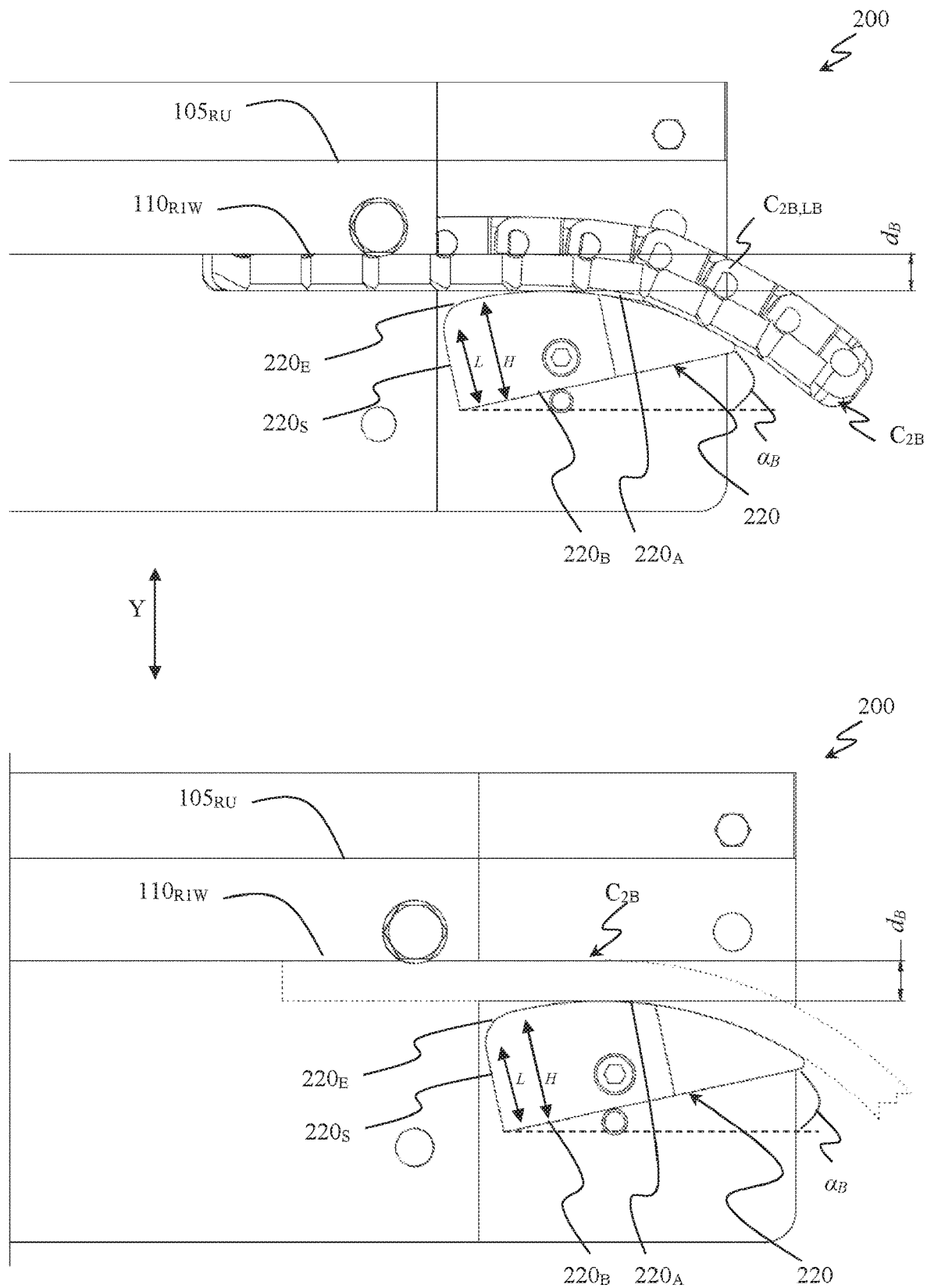
Figure 2C:
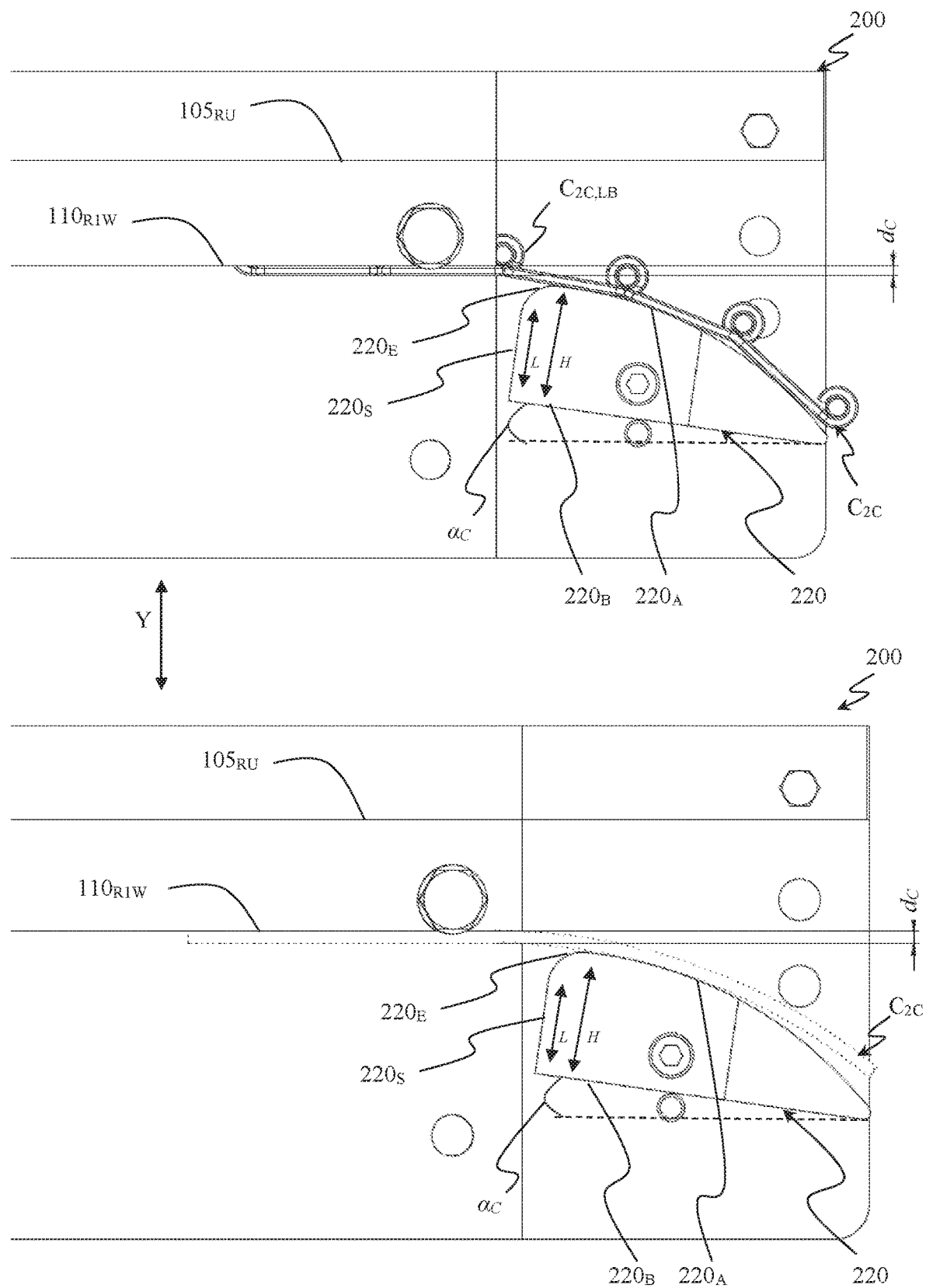

With reference to FIGS. 2A, 2B and 2C, they show side views of a guide structure 200 according to an embodiment of the present invention, in respective angular positions of the accompanying means.

In this exemplary embodiment of the present invention, the accompanying means of the guide structure 200 comprises a shoe 220 whose contact surface has a rounded profile. In the exemplary considered embodiment, the shoe 220 comprises a base $220_B$ (e.g., as illustrated, a rectilinear base), a rectilinear side $220_S$ having length L and extending orthogonally (or substantially orthogonally) from an end of the base $220_B$ (i.e., the end that, in operation, is proximal to the inlet of the guide channel $115_R$), an arc-shaped side $220_A$ extending from the opposite end of the base $220_B$ to a point that, along a direction orthogonal to the base $220_B$, is at a distance H from the base $220_B$ higher than the length L, and an elbow side $220_E$ connecting the rectilinear side $220_S$ to the arc-shaped side $220_A$. In the following, for ease of description, the elbow side $220_E$ will be referred to as lobe of the shoe 220, whereas the end of the base $220_B$ connected to the arc-shaped side 220, will be referred to as tip of the shoe 220. In this exemplary shape, the contact surface of the shoe 220 is defined by the arc-shaped side $220_A$ and by the lobe $220_E$ (or at least a portion thereof).

For ease of representation, FIGS. 2A, 2B and 2C comprise each one a top drawing illustrating the guide structure 200 with the shoe 220 in a respective angular position and with an exemplary chain $C_{2A}$, $C_{2B}$, $C_{2C}$ resting and sliding on the shoe 220 (i.e., on its contact surface) when the shoe 220 is fixed in that angular position, and a bottom drawing illustrating the same guide structure 200 with the shoe 220 in the same angular position, but with the same chain $C_{2A}$, $C_{2B}$, $C_{2C}$ shown with a simplified representation, for better intelligibility. The chains $C_{2A}$, $C_{2B}$, $C_{2C}$ are not part of the guide structure 200, however their representation, and particularly the representation of chains having different thicknesses, is, in these and in the following figures, functional to the understanding of the contribution made by the guide structures according to embodiments of the present invention.

In an exemplary angular position, illustrated in FIG. 2A, the shoe 220 (i.e., the rectilinear base $220_B$) is substantially parallel with respect to a horizontal plane parallel to the guide channel $115_R$ (i.e., parallel to the lower surface of the guide channel, or, equivalently, parallel to the lowermost surface of the guide channel)—rotation angle $\alpha_A \approx 0$). In this angular position (in this case, horizontal position), the minimum distance between the contact surface and the guide channel $115_R$ (i.e., between the contact surface and a plane on which the lower walls $110_{R1W}$, $110_{R2W}$ of the rails $110_{R1}$, $110_{R2}$ lay) is substantially in correspondence of the contact point between the arch-shaped side $220_A$ and the lobe $220_E$, and has a distance value $d_A$. As should be readily understood, in this first exemplary angular position, the shoe 220 according to this embodiment is able to support and accompany into the guide channel $115_R$ a chain $C_{2A}$ with a thickness that depends on an actual positioning of the shoe 220 along the vertical direction Y (i.e., its vertical position), and, once the vertical position has been chosen, on the curvatures of the arch-shaped side $220_A$ and/or of the lobe $220E$ (the curvatures of the arch-shaped side $220A$ and/or of the lobe $220_E$ in turn depending, for example, on parameters such as height H and length L). By way of example only, and for only purposes of comparison with respect to the chains $C_{2B}$ and $C_{2C}$ respectively illustrated in FIGS. 2B and 2C, the chain $C_{2A}$ may have a thickness of about 8.7 mm.

In another exemplary angular position, illustrated in FIG. 2B, the shoe 220 is anticlockwise rotated, with respect to the horizontal plane, by a rotation angle $\alpha_B$ that determines, with respect to the vertical direction Y and with respect to the horizontal position, a lowering of the lobe $220_E$ and a rising of the tip. This determines that the minimum distance between the contact surface and the guide channel $115_R$ is substantially in correspondence of the centre of the arc-shaped side $220_A$. Therefore, in this exemplary angular position, the minimum distance of the contact surface from the guide channel $115_R$ has a distance value $d_B$ that is higher than the distance value $d_A$, which allows the shoe 220 to support and accompany into the guide channel $115_R$ a chain $C_{2B}$ with thickness higher than the thickness of the chain $C_{2A}$. By way of example only, the chain $C_{2B}$ may have a thickness of about 12.7 mm—in any case, the percentage increase in thickness with respect to the exemplary angular position having rotation angle $\alpha_A \simeq 0$ may depend on different design options, such as curvature of the arc-shaped side $220_A$ and/or of the lobe $220_E$. This exemplary angular position may substantially represent a maximum rotation in the anticlockwise direction compatible with a correct operation of the shoe 220 in its accompanying function (in fact, a further anticlockwise rotation of the shoe 220 would result, by construction, in an excessive rising of the tip which would hinder the sliding of the chain $C_{2B}$).

In another exemplary angular position, illustrated in FIG. 2C, the shoe 220 is clockwise rotated, with respect to the horizontal plane, by a rotation angle $\alpha_C$ that determines, with respect to the vertical direction Y and with respect to the horizontal position, a raising of the lobe $220_E$ and a lowering of the tip. This determine that the minimum distance between the contact surface and the guide channel $115_R$ is substantially in correspondence of the lobe $220_E$ (in the example at issue, between a lobe centre and the contact point between the arc-shaped side $220_A$ and the lobe $220_E$). Therefore, in this exemplary angular position, the minimum distance of the contact surface from the guide channel $115_R$ has a distance value $d_C$ that is lower than the distance value $d_A$, which allows the shoe 220 to support and accompany into the guide channel $115_R$ a chain $C_{2C}$ with thickness lower than the thickness of the chain $C_{2A}$. By way of example only, the chain $C_{2C}$ may have a thickness of about 5 mm—in any case, the percentage reduction in thickness with respect to the exemplary angular position having rotation angle $\alpha_A \simeq 0$ may depend on different design options, such as curvature of the arc-shaped side $220_A$ and/or of the lobe $220_E$. This exemplary angular position may substantially represent a maximum rotation in the clockwise direction compatible with a correct operation of the shoe 220 in its accompanying function (moreover, a further clockwise rotation of the shoe 220 would not result, by construction, in a further or significant reduction of the minimum distance).

Figure 2D:
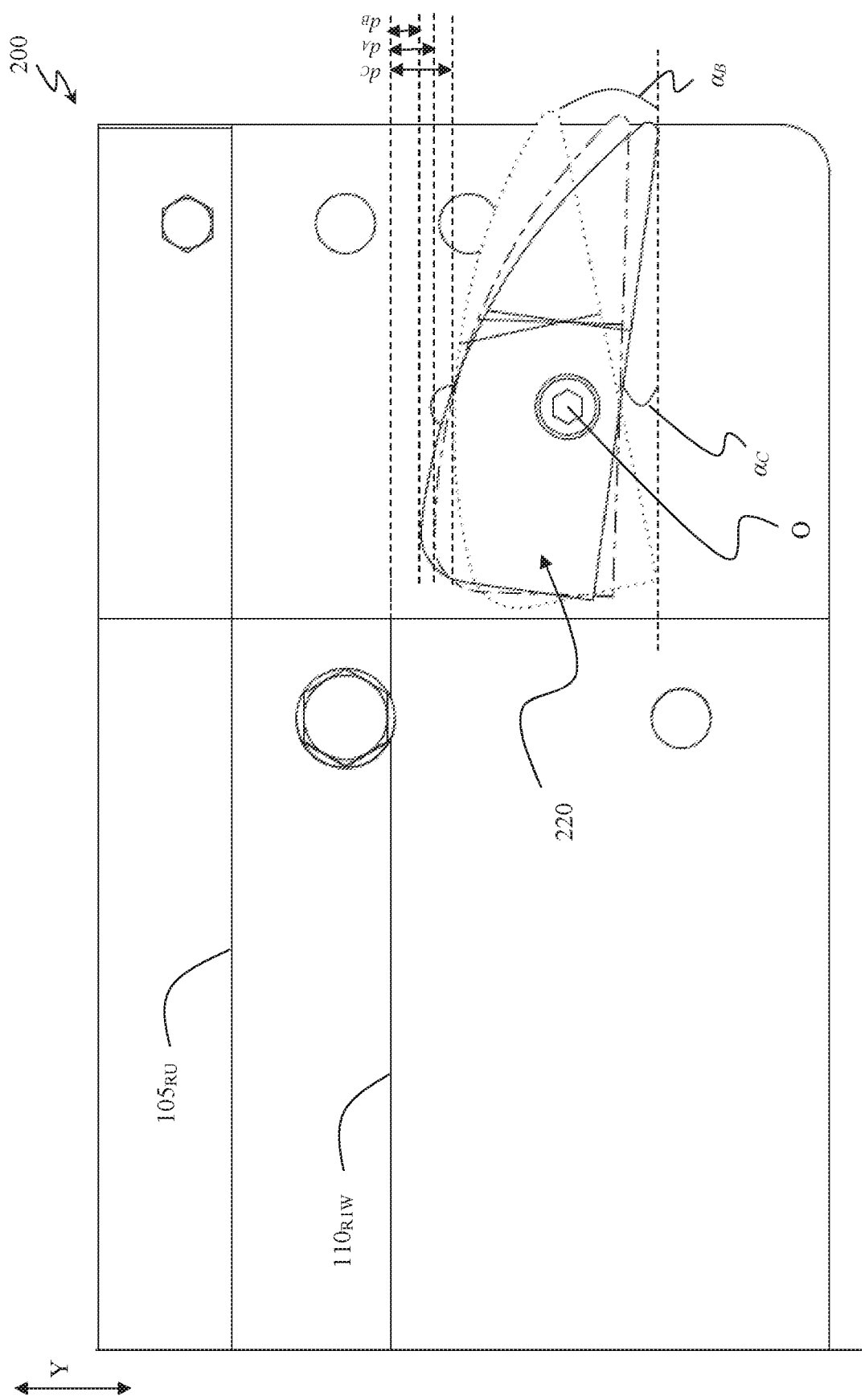
FIG. 2D shows a side view of the guide structure of FIGS. 2A, 2B and 2C, with the accompanying means illustrated in the angular positions of the FIGS. 2A, 2B and 2C overlapped to each other.

The exemplary angular positions illustrated in FIGS. 2A, 2B and 2C are also visible, overlapped to each other, in FIG. 2D. In this figure, the differences between the distance values $d_A$, $d_B$ and $d_C$ and the respective rotation angles $\alpha_A$, $\alpha_B$ and $\alpha_C$ can be better appreciated with a single view—it is worth noting that, although three exemplary angular positions of the shoe 220 are illustrated in the figures, a number of angular positions (e.g., with rotation angles between the rotation angle $\alpha_B$ and the rotation angle $\alpha_C$) are possible. FIG. 2D also shows that the angular positions at the rotation angles $\alpha_A$, $\alpha_B$ and $\alpha_C$ (and at any other rotation angle between the rotation angle $\alpha_B$ and the rotation angle $\alpha_C$) are obtained by rotation of the shoe 220 about a rotation axis O (as better discussed in the following, the rotation axis O identifying or being defined by the position of the adjusting and fixing means of the guide structure 200 with respect to the shoe 220).

Figure 2E:
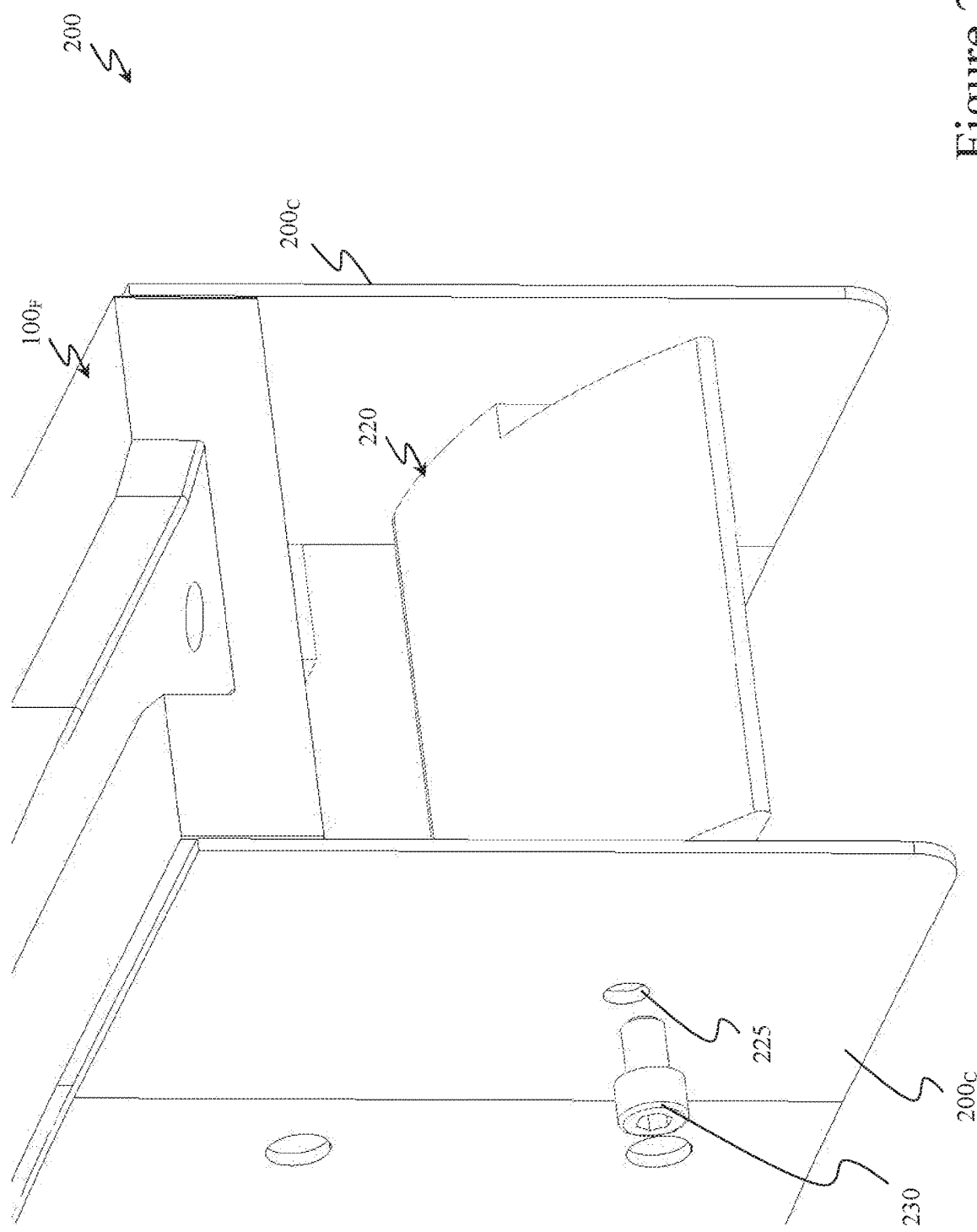
FIGS. 2E and 2F show perspective and partially exploded views with removed parts of the guide structure of FIGS. 2A-2D, wherein both adjusting and fixing means are visible.
Figure 2F:
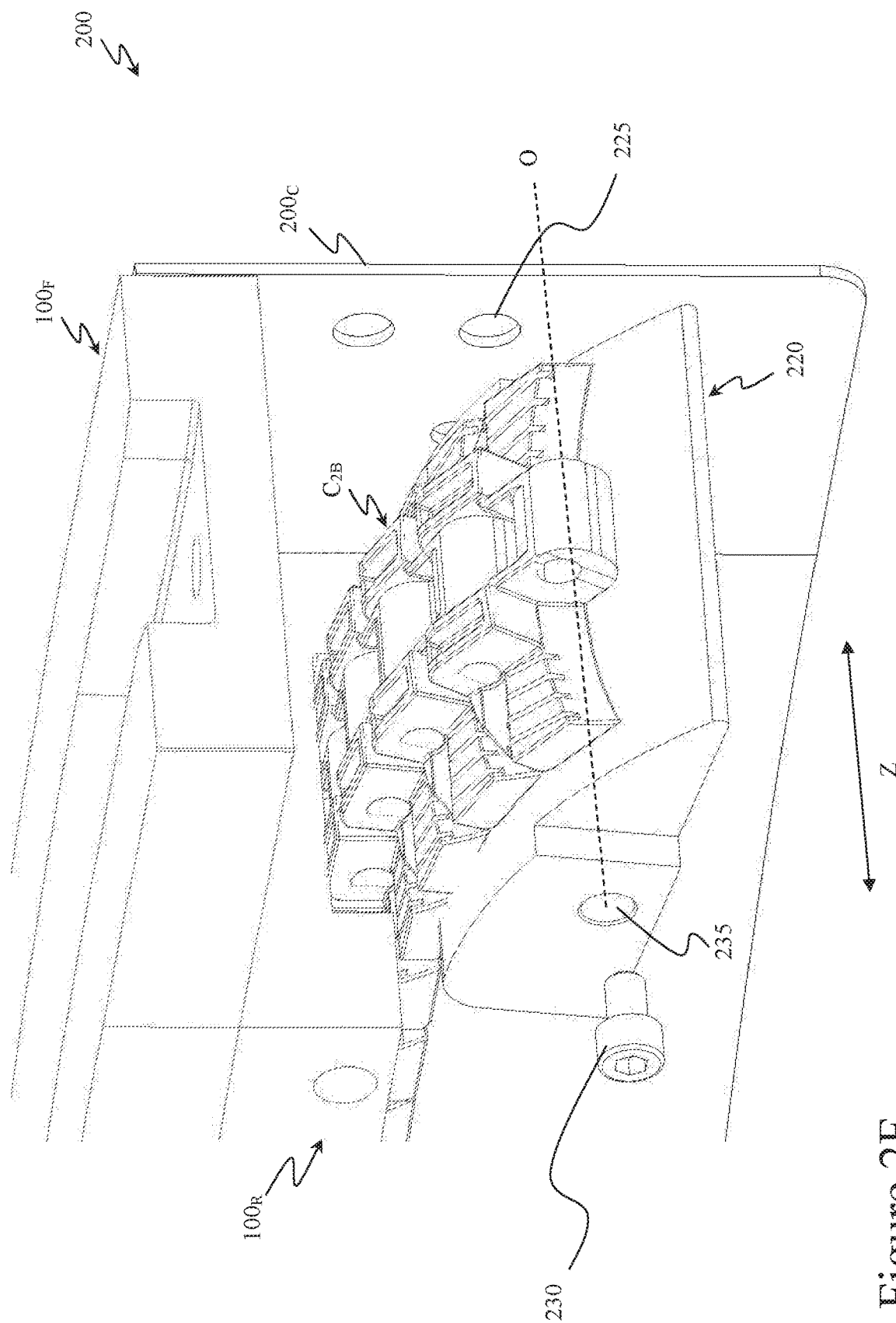

As mentioned above, the guide structure 200 also comprises adjusting means for adjusting the angular position of the shoe 220 with respect to the guide channel $115_R$ and fixing means for keeping the shoe 220 in the adjusted angular position. With reference now to FIGS. 2E and 2F, they show perspective and partially exploded views with removed parts of the guide structure 200, wherein both adjusting and fixing means according to an embodiment of the present invention are visible (for ease of representation, only in FIG. 2F a chain is also illustrated—just as an example the chain $C_{2B}$ is illustrated).

The adjusting means preferably comprises two circular holes (through holes) 225 at respective opposite side walls of the carter $200_C$, and the fixing means comprises screws 230 adapted to be screwed into two threaded holes 235 (advantageously, circular in shape as well) formed in the shoe 220 (only one threaded hole 235 being visible in FIG. 2F)—as will be understood from the following discussion, the threaded holes 235 acting both as fixing means (in that, the fixing of the shoe 220 is carried out by screwing the screws 230 thereinto), and as adjusting means (as the threaded holes 235 also define or are identified by the rotation axis O of the shoe 220). The threaded holes 235 are preferably formed from respective side walls of the shoe 220 that, in operation, face the side walls of the carter $200_D$, and extend inside the shoe 220, along the transversal direction Z (when considering the shoe 220 in position between the carter side walls), for an extent corresponding to the screw length—as an alternative, not shown, a single through hole may be formed inside the shoe 220, along the transversal direction Z, such that the shoe 220 may be kept in the desired angular position by a bolt and nut pair as a fixing means. Therefore, in operation, when positioning the shoe 220 between the side walls of the carter $200_C$ (with the threaded holes 235 of the shoe 220 matching respective through holes 225 of the carter $200_C$) and inserting and partially screwing the screws 230 into the through holes 225 of the carter 200C and into the threaded hole 235 of the shoe 220, the shoe 220 can be adjusted or oriented or rotated by an operator in the desired angular position depending on the chain to be used. Upon rotating the shoe 220 in the desired angular position, further screwing of the screws 230 allows the shoe 220 to be firmly kept in the desired angular position.

Therefore, the vertical position of the shoe 220 can be adjusted by rotation of the shoe 220 about a rotation axis O identified by the threaded holes 235. Compared to the guide structure 100, in which the vertical position of the accompanying means is adjusted by means of its vertical sliding along the (vertical) elongated openings 125, the present invention allows achieving a same, or even better, adjusting of the vertical position by means of circular holes formed in the carter $200_C$. Circular holes instead of vertically elongated openings are advantageous in that they allow simple and cheap machining. Moreover, adjusting the vertical position of the shoe 220 requires reduced times and only one operator. Last but not least, the chain thicknesses that are admitted by the guide structure 200 depend on the shape or profile of the shoe 220, rather than on the shape and the precision (i.e., tolerances) of the holes 225, whereby the guide structure 200 is adapted to accompany into the guide channel $115_R$ chains having wide thickness ranges.

Figure 3A:
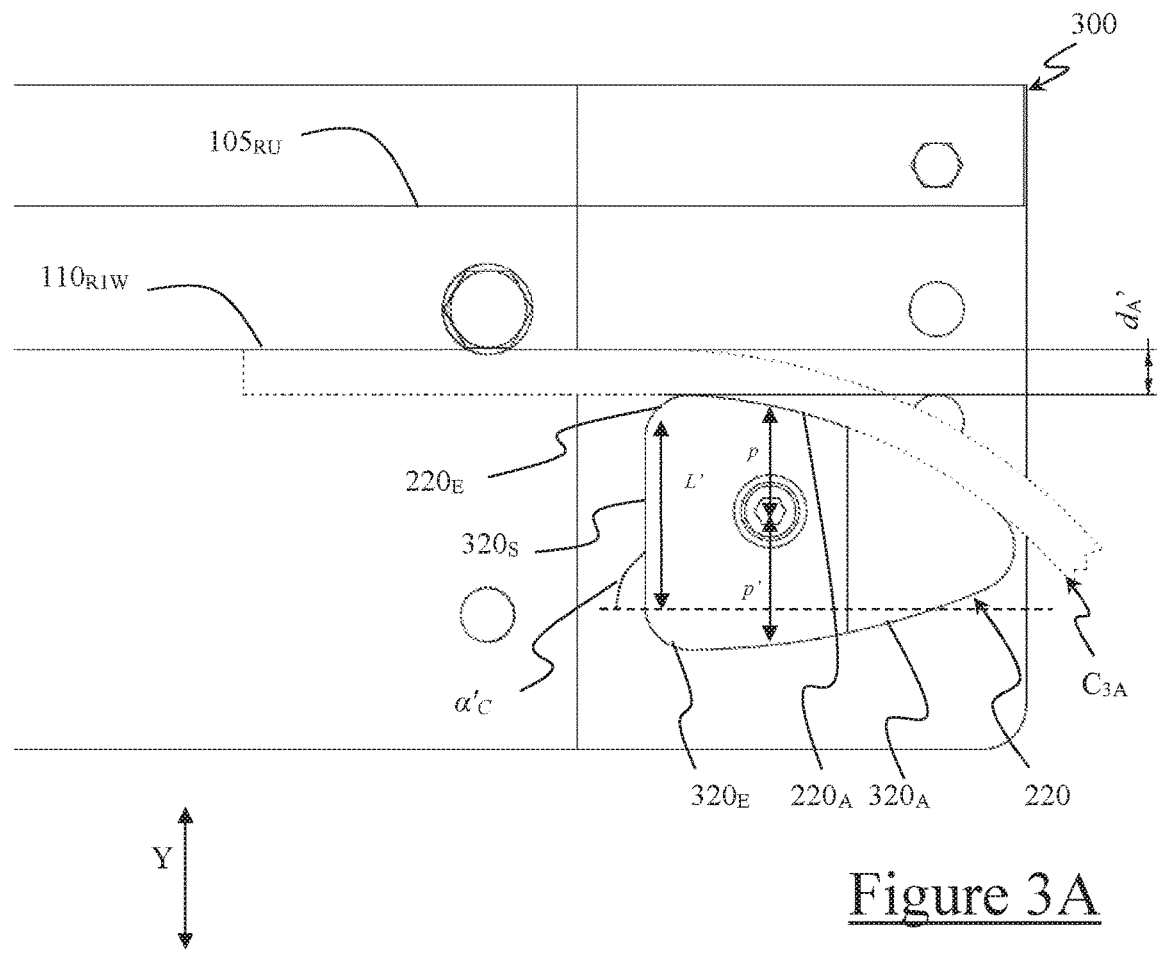
FIGS. 3A and 3B show side views of a guide structure according to another embodiment of the present invention, with accompanying means in respective angular positions and in a first mounting configuration.
Figure 3B:
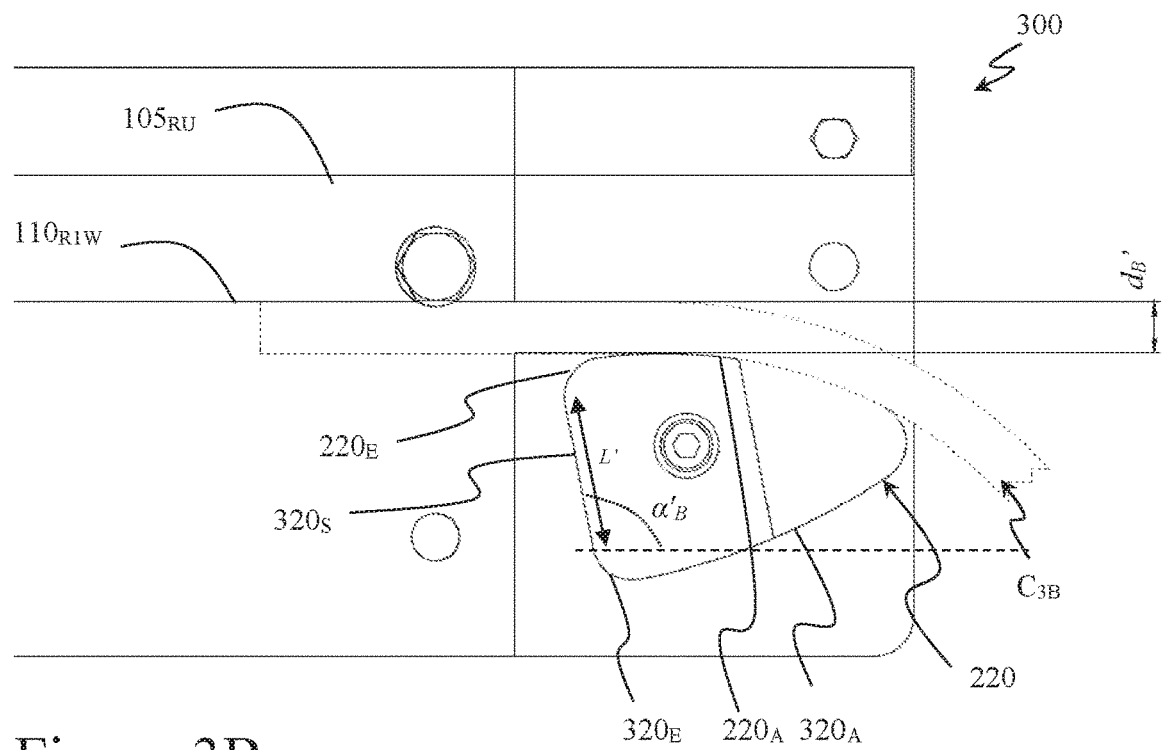
Figure 3C:
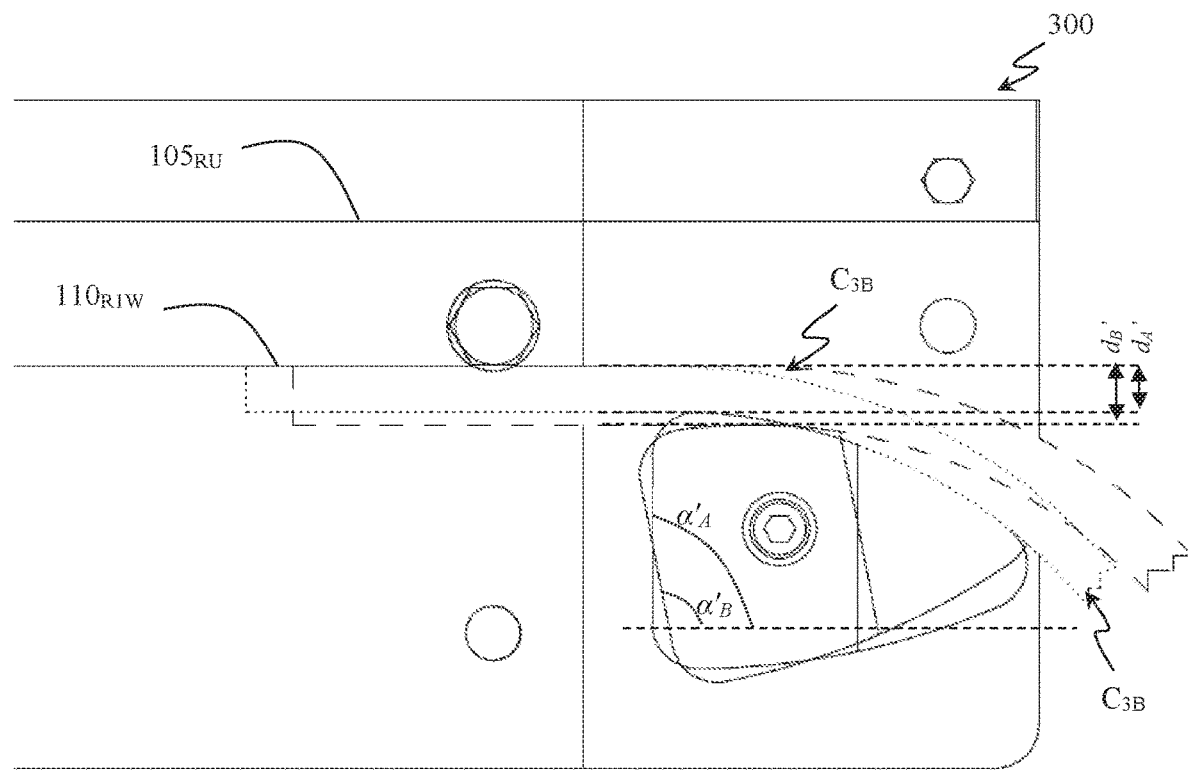
FIGS. 3C and 3D show, respectively with chain and without chain, a side view of the guide structure of FIGS. 3A and 3B, with the accompanying means illustrated in the angular positions of the FIGS. 3A and 3B overlapped to each other.
Figure 3D:
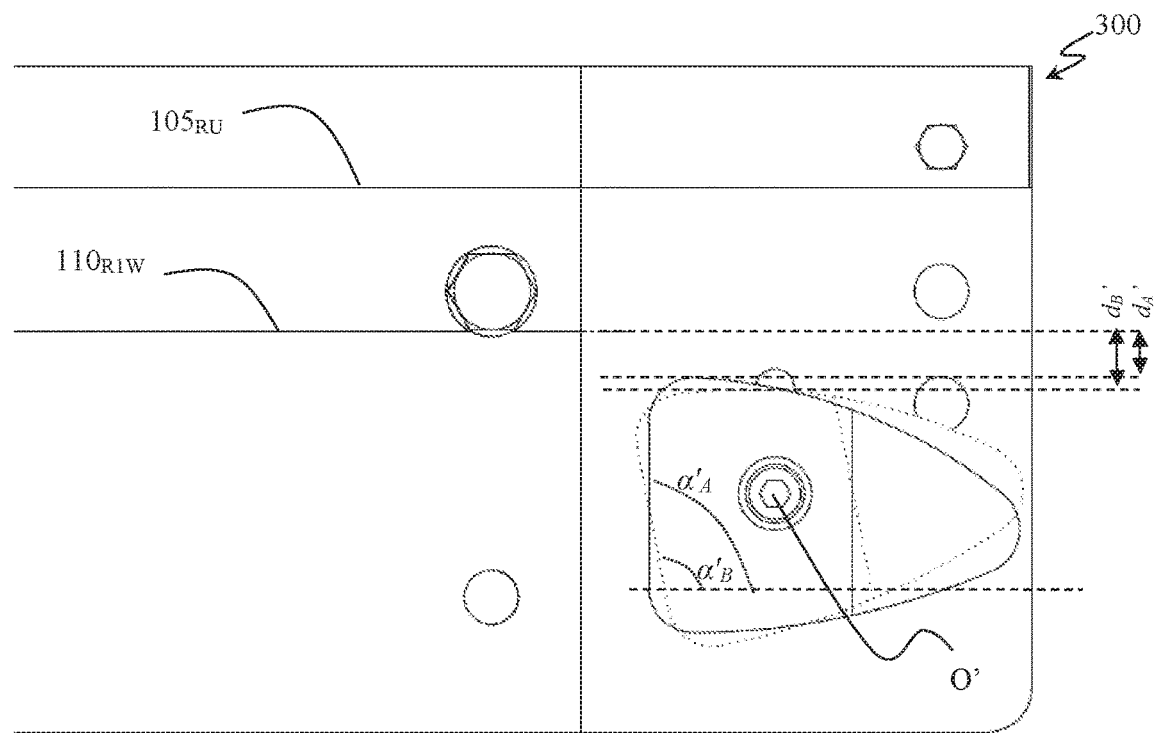

FIGS. 3A and 3B show side views of a guide structure 300 according to another embodiment of the present invention, with accompanying means in respective angular positions, and FIGS. 3C and 3D show, respectively with chains and without chains, a side view of the guide structure 300 (with the accompanying means illustrated in the angular positions of FIGS. 3A and 3B overlapped to each other).

Figure 3E:
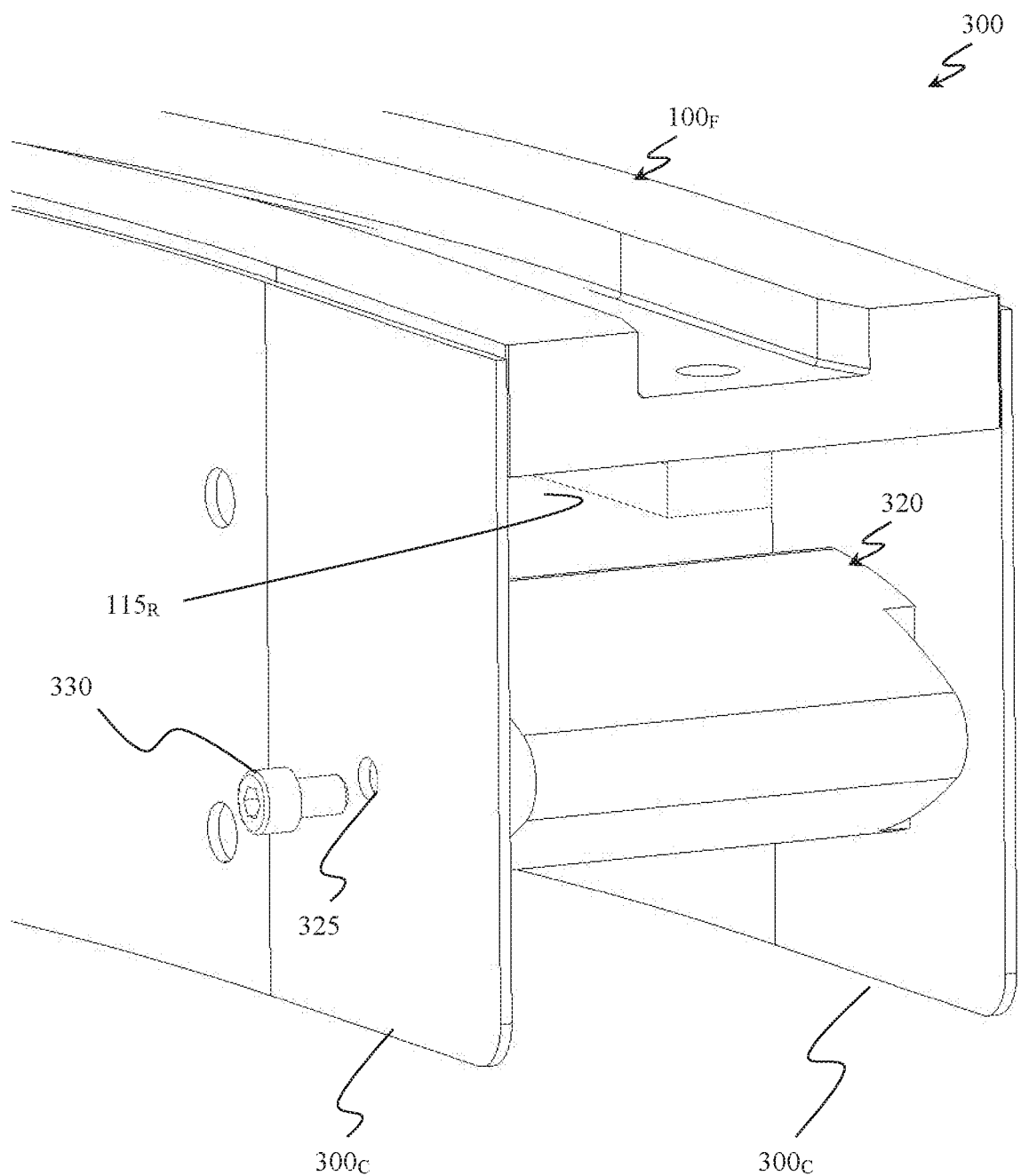
FIGS. 3E and 3F show perspective and partially exploded views with removed parts of the guide structure of FIGS. 3A-3D, wherein both adjusting and fixing means are visible.
Figure 3F:
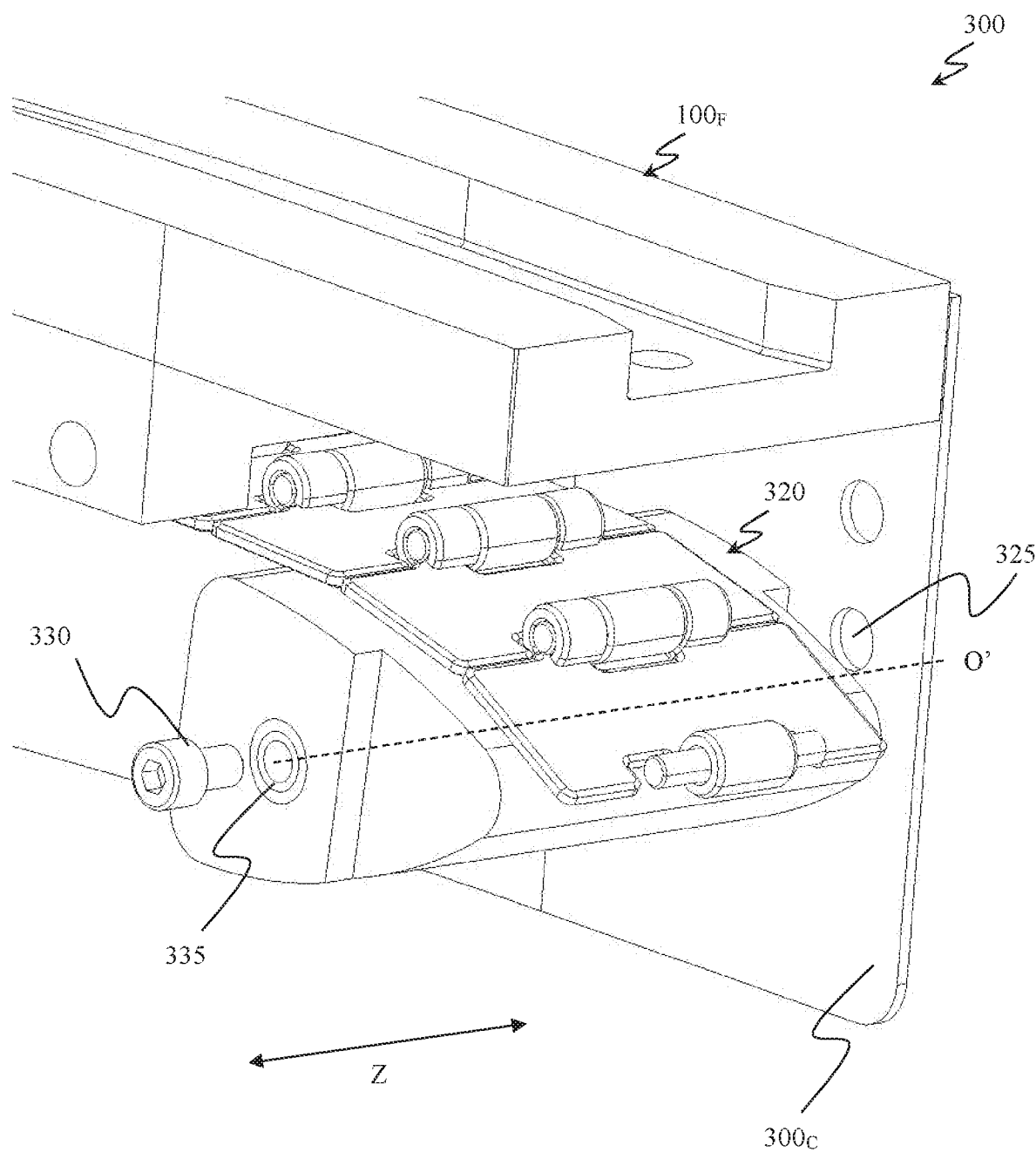
Figure 3G:
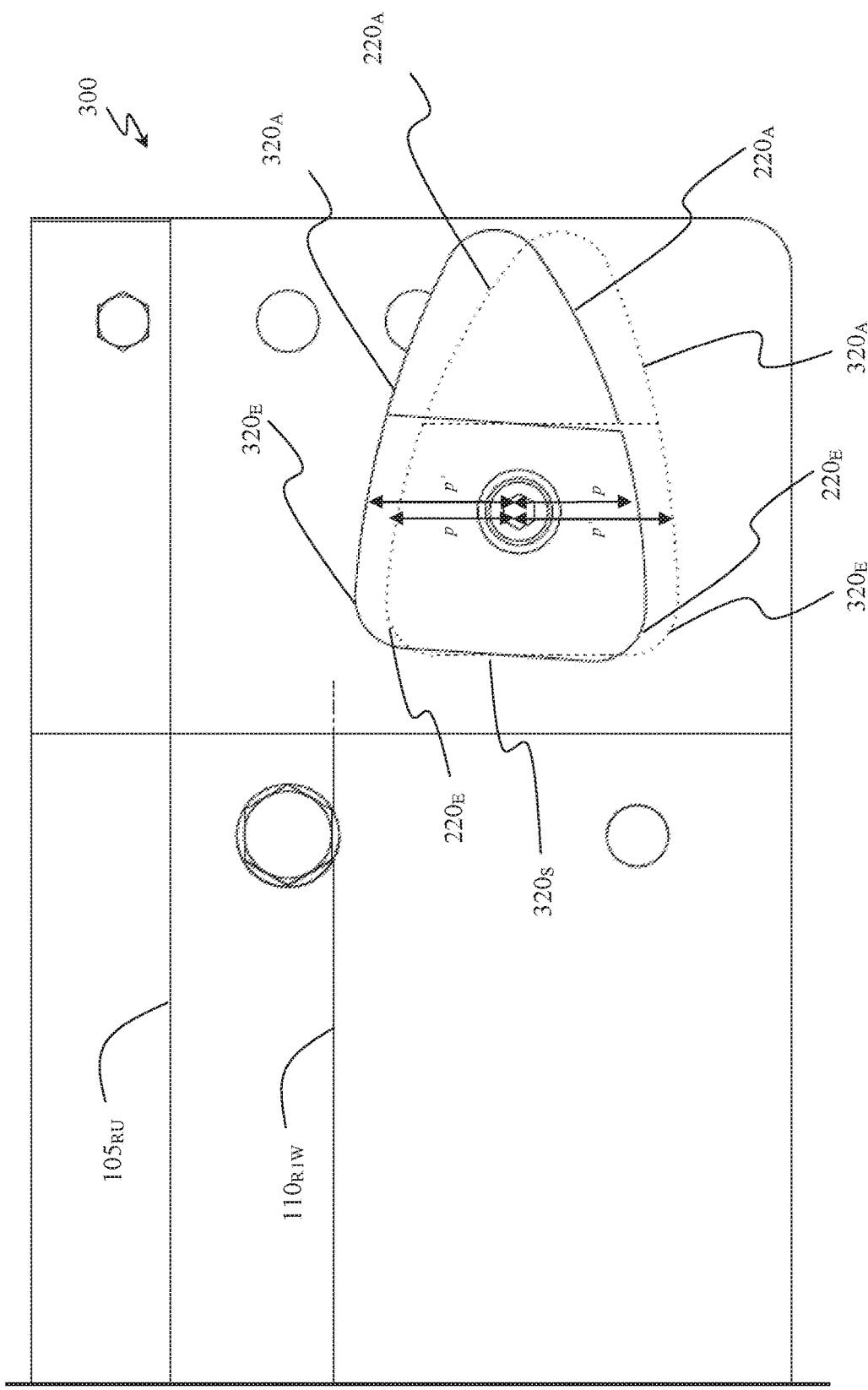
FIG. 3G shows a side view of the guide structure of FIGS. 3A-3D, with the accompanying means illustrated, for the same angular position, in the first mounting configuration of FIGS. 3A-3D and in a second mounting configuration overlapped to each other.

In this exemplary embodiment of the present invention, the accompanying means of the guide structure 300 comprises a shoe 320 having a contact surface with a rounded profile (in the example at issue, the contact surface is the same as the contact surface of the shoe 220, i.e. it is defined by the arc-shaped side $220_A$ and by—at least a portion of—the lobe $220_E$), and a further contact surface opposite to the contact surface, such that the shoe 320 can be arranged in a first mounting configuration (illustrated in FIGS. 3A-3D) in which the contact surface faces, in operation, the chain, or a in second mounting configuration (illustrated in FIGS. 3F and 3G) in which the further contact surface faces, in operation, the chain (the first mounting configuration and the second mounting configuration overlapped to each other being illustrated, for a same angular position of the shoe 320, in FIG. 3G).

In the illustrated example, the second contact surface has a rounded profile.

According to an embodiment of the present invention, the rounded profile of the further contact surface may be the same as the rounded profile of the contact surface. According to an alternative embodiment of the present invention, as herein assumed and illustrated, the rounded profile of the further contact surface differs (or, as illustrated, slightly differs) from the rounded profile of the contact surface.

In both embodiments, however, the shoe 320 comprises, in addition to the arc-shaped side $220_A$, and to the lobe $220_B$, a rectilinear side $320_S$, a further arc-shaped side $320_A$ from the tip of the shoe 320, and a further lobe $320_E$ connecting the further arc-shaped side $320_A$ to the rectilinear side $320_S$ (the rectilinear side $320_S$ being similar to the rectilinear side $220_S$ but preferably having a different length L' due to the presence of the further arc-shaped side $320_A$ and of the further lobe $320_E$). In the example at issue, the further contact surface of the shoe 320 is defined by the further arc-shaped side $320_A$ and by (at least a portion of) the further lobe $320_E$. Therefore, the shoe 320 results in a substantially pear shaped cam profile.

With reference first to FIGS. 3A and 3B, the guide structure 300 is illustrated with the shoe 320 in respective angular positions and with exemplary chains $C_{3A}, C_{3B}$ resting and sliding on the shoe 320 (wherein, for ease of illustration, the chains $C_{3A}, C_{3B}$ are shown with a simplified representation). The exemplary angular positions illustrated in FIGS. 3A and 2B are also visible, overlapped to each other, in FIG. 3C.

The exemplary angular position of the shoe 320 illustrated in FIG. 3A is the same angular position of the shoe 220 illustrated in FIG. 2A (i.e., taking the rectilinear side $320_S$ as a reference, with the shoe 320 that has its rectilinear side $320_S$ substantially orthogonal with respect to the horizontal plane parallel to the guide channel $115_R$). Therefore, in the example at issue in which the shoe 220 and the shoe 320 have same contact surface (and assuming that the shoe 320 has the same vertical position as the shoe 220), the minimum distance between the contact surface and the guide channel $115_R$ has a distance value $d_A'=d_A$ that allows the shoe 320 to support and accompany into the guide channel 115 a chain $C_{3A}$ with thickness of about 8.7 mm (similarly to the chain $C_{2A}$ illustrated in FIG. 2A). Having taken the rectilinear side $320_S$ as a reference, the angular position of the shoe 320 illustrated in FIG. 3A identifies a rotation angle $\alpha'_A \approx 90°$ between the rectilinear side $320_S$ and the horizontal plane (as should be readily understood, the rotation angles $\alpha_A$ and $\alpha'_A$ are phase-shifted by 90° due to the fact that in FIG. 2A the angular position of the shoe 220 has been identified by taking the base $220_B$ of the shoe 220 and the horizontal plane as reference, whereas in FIG. 3A the angular position of the shoe 320 has been identified by taking the rectilinear side $320_B$ of the shoe 320 and the horizontal plane as reference, the rectilinear side $320_B$ and the base $220_B$ being orthogonal to each other).

The exemplary angular position of the shoe 320 illustrated in FIG. 3B is the same angular position of the shoe 220 illustrated in FIG. 2B (i.e., with the shoe 320 that is anticlockwise rotated, with respect to the horizontal plane, by a rotation angle $\alpha'_B$). Therefore, in the example at issue in which the shoe 220 and the shoe 320 have same contact surface (and assuming that the shoe 320 has the same vertical position as the shoe 220), the minimum distance between the contact surface and the guide channel $115_R$ has a distance value $d_B'=d_B$ that allows the shoe 320 to support and accompany into the guide channel $115_R$ a chain $C_{3B}$ with thickness of about 12.7 mm (similarly to the chain $C_{2B}$ illustrated in FIG. 2B).

Although not shown, the shoe 320 may also take the same angular position of the shoe 220 illustrated in FIG. 2C (i.e., with the shoe 320 that is anticlockwise rotated, with respect to the horizontal plane, by a rotation angle $\alpha'_C$), in which case the minimum distance between the contact surface and the guide channel $115_R$ has a distance value $d_C'=d_C$ that allows the shoe 320 to support and accompany into the guide channel $115_R$ a chain $C_{3C}$ with thickness of about 5 mm (similarly to the chain $C_{2C}$ illustrated in FIG. 2C).

Naturally, same considerations about the thickness of the chains $C_{2A}, C_{2B}, C_{2C}$ and its dependence on design options such as curvature of the arc-shaped side $220_A$ and/or of the lobe $220_E$, and/or vertical position of the shoe 220, equivalently apply to the thickness of the chains $C_{3A}, C_{3B}, C_{2C}$, at least in this first mounting configuration (in which the shoe 220 and the shoe 320 have same contact surface).

Similarly to the guide structure 200, the guide structure 300 also comprises adjusting means for adjusting the angular position of the shoe 320 with respect to the guide channel $115_R$ and fixing means for keeping the shoe 320 in the adjusted angular position. With reference now to FIGS. 3E and 3F, they show perspective and partially exploded views with removed parts of the guide structure 300, wherein both adjusting and fixing means according to an embodiment of the present invention are visible.

Similarly to the guide structure 200, the adjusting means of the guide structure 300 preferably comprises two holes (through holes) 325 at respective opposite side walls of the carter $300_C$, and the fixing means comprises screws 330 adapted to be screwed into two threaded holes 335 formed in the shoe 320 (only one threaded hole 335 being visible in FIG. 3F). The threaded holes 335 are preferably formed from respective side walls of the shoe 320 that, in operation, face the side walls of the carter $300_C$, and extend inside the shoe 320, along the transversal direction Z (when considering the shoe 320 in position between the carter side walls), for an extent corresponding to the screw length—as an alternative, not shown, a single through hole may be formed inside the shoe 320, along the transversal direction Z, such that the shoe 320 may be kept in the desired angular position by a bolt and nut pair as a fixing means. Therefore, in operation, when positioning the shoe 320 between the side walls of the carter $300_C$ (with the threaded holes 335 of the shoe 320 matching respective through holes 325 of the carter $300_C$) and inserting and partially screwing the screws 330 into the through holes 325 of the carter $300_C$ and into the threaded hole 335 of the shoe 320, the shoe 320 can be adjusted or oriented or rotated (about a rotation axis O') by an operator in the desired angular position depending on the chain to be used. Upon rotating the shoe 320 in the desired angular position, further screwing of the screws 330 allows the shoe 320 to be firmly kept in the desired angular position.

Similarly to the previous embodiment, the rotation axis O' identifies or is defined by the position of the threaded hole 335 with respect to the shoe 320. In addition, in the guide structure 300, the position of the rotation axis O' also determines different uses of the shoe 320 in the first and second mounting configurations, as explained here below.

According to an embodiment of the present invention, not shown, the rotation axis O' has, along the vertical direction Y, a distance p from the contact surface and a same distance p from the further contact surface, whereby when the shoe 320 is arranged in the second mounting configuration (with the further contact surface facing the chain), the angular positions of the shoe 320 determine substantially same distance values of the minimum distances between the further contact surface and the guide channel $115_R$ (especially when considering essentially same rounded profiles of the contact surface and of the further contact surface). This embodiment could be useful when high wear of the contact surface is expected (e.g., due to the friction of the chain sliding thereon), such that the further contact surface may act as a "backup" contact surface that avoids replacement of the whole shoe 320.

Figure 3H:
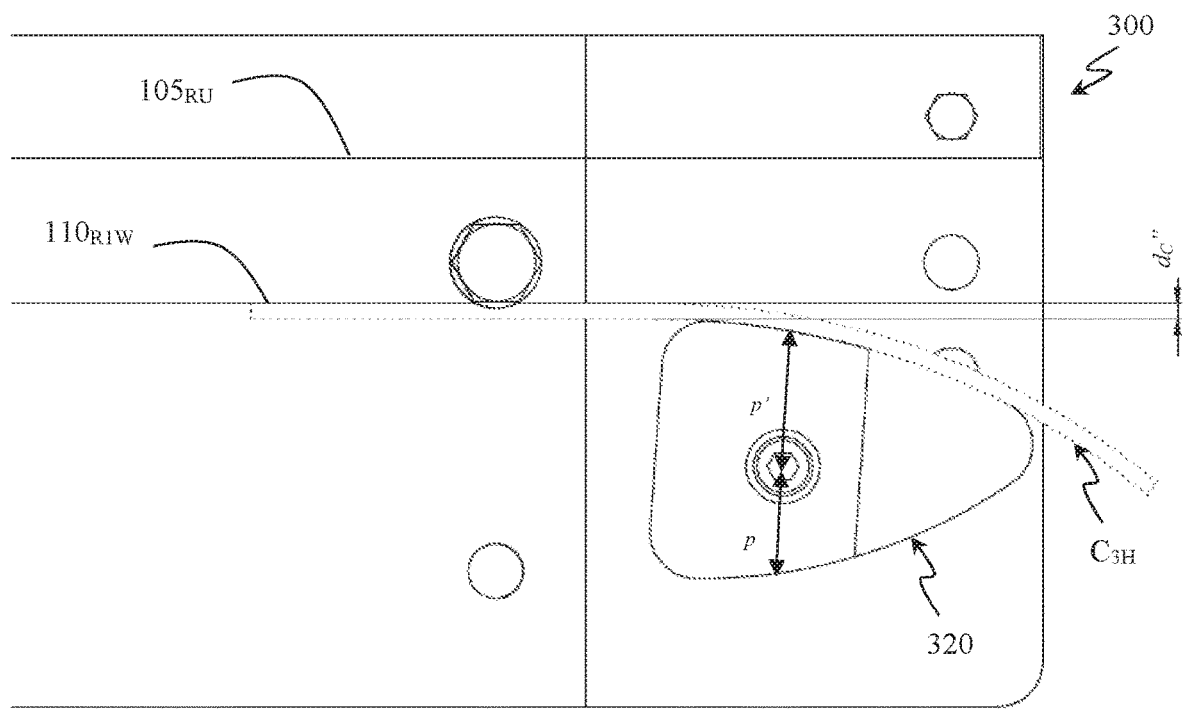
FIGS. 3H and 3I show side views of the guide structure of FIGS. 3A-3D, with the accompanying means in the second mounting configuration of FIG. 3G and in respective angular positions.

According to the exemplary considered embodiment, the rotation axis O' has, along the vertical direction Y, a distance p from the contact surface and a further distance p' from the further contact surface (for ease of illustration, the distance p and the further distance p' are illustrated only in FIGS. 3A, 3G and 3H). The distance p and the further distance p' are different from each other, whereby when the shoe 320 is arranged in the second mounting configuration (with the further contact surface facing the chain), the angular positions of the shoe 320 determines distance values of the minimum distances between the further contact surface and the guide channel $115_R$ that are different from the corresponding distance values (i.e., the distance values at the same angular positions) of the shoe 320 in the first mounting configuration. This embodiment could be useful when chain thicknesses out of the range of chain thicknesses allowed by the contact surface are required, as better discussed here below.

The mounting of the shoe 320 in the second mounting configuration (i.e., upside down with respect to the first mounting configuration) has the effect that, for the same angular positions of the shoe 320, the further contact surface is closer or farther to the guide channel $115_R$ according to a ratio between the distance p and the further distance p'. In the example at issue in which the further distance p' is higher than the distance p, in the second mounting configuration of the shoe 320 (i.e., further contact surface-facing the chain) the further contact surface is closer to the guide channel $115_R$ than the contact surface is, for the same angular position, in the first mounting configuration (i.e., contact surface facing the chain), as visible in FIG. 3G (wherein the shoe 320 in the first mounting configuration is illustrated, in dashed line, overlapped to the shoe 320 in the second mounting configuration, in solid line).

Figure 3I:
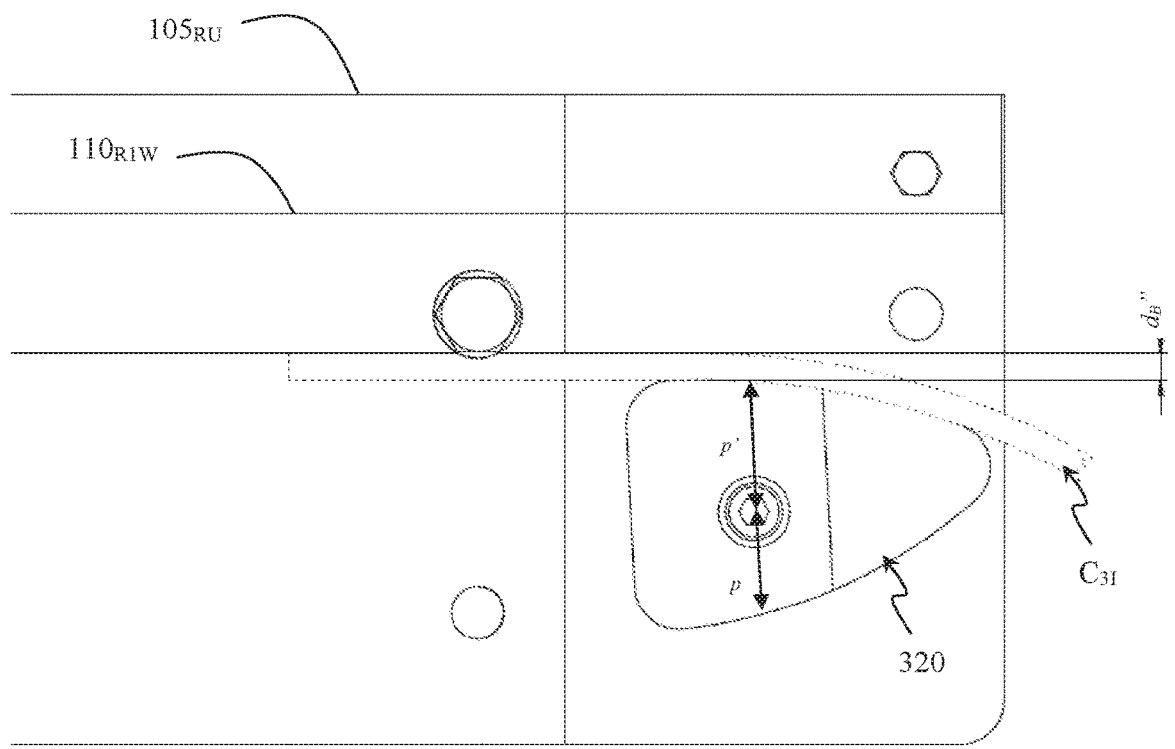

With reference now to FIGS. 3H and 3I, they show side views of the guide structure 320, with the shoe 320 in the second mounting configuration and in respective angular positions.

The exemplary angular position of the shoe 320 illustrated in FIG. 3H is the same angular position of the shoe 220 illustrated in FIG. 2C, i.e. with the shoe 320 that is clockwise rotated, with respect to the horizontal plane, by a rotation angle that determines, with respect to the vertical direction Y and with respect to the horizontal position, a raising of the further lobe $320_E$ and a lowering of the tip. This determines that the minimum distance between the further contact surface and the guide channel $115_R$ is substantially in correspondence of the further lobe $320_E$ (in the example at issue, between a centre of the further lobe and the contact point between the further arc-shaped side $320_A$ and the further lobe $320_E$). Therefore, in this exemplary angular position, the minimum distance of the further contact surface from the guide channel $115_R$ has a distance value $d_C''$ that is lower than the distance value $d_C'$ that, for the same angular position of the shoe 320, the contact surface has from the guide channel $115_R$ when the shoe 320 is in the first mounting configuration. This allows the shoe 320 to support and accompany into the guide channel $115_R$ a chain $C_{3H}$ with thickness lower than the thickness of the chain $C_{2C}$ (or $C_{3C}$). By way of example only, the chain $C_{3H}$ may have a thickness of about 3 mm—in any case, the percentage reduction in thickness with respect to the same angular position with the shoe 320 in the first configuration depends on different design options, such as curvature of the further arc-shaped side $320_A$ and/or of the further lobe $320_E$, and/or vertical position of the rotation axis O' (i.e., ratio between the distance p and the further distance p'). This exemplary angular position may substantially represent a maximum rotation in the clockwise direction compatible with a correct operation of the shoe 320 (in the second mounting configuration) in its accompanying function (moreover, a further clockwise rotation of the shoe 320 would not result, by construction, in a further or significant reduction of the minimum distance).

The exemplary angular position of the shoe 320 illustrated in FIG. 3I is the same angular position of the shoe 220 illustrated in FIG. 2B and of the shoe 320 illustrated in FIG. 3B, i.e. with the shoe 320 that is anticlockwise rotated, with respect to the horizontal plane, by a rotation angle that determines, with respect to the vertical direction Y and with respect to the horizontal position, a lowering of the further lobe $320_E$ and a rising of the tip. This determines that the minimum distance between the further contact surface and the guide channel $115_R$ is substantially in correspondence of the centre of the further arc-shaped side $320_A$. Therefore, in this exemplary angular position, the minimum distance of the further contact surface from the guide channel $115_R$ has a distance value $d_B''$ that is lower than the distance value $d_B'$ that, for the same angular position of the shoe 320, the contact surface has from the guide channel $115_R$ when the shoe 320 is in the first mounting configuration. This allows the shoe 320 to support and accompany into the guide channel $115_R$ a chain $C_{3I}$ with thickness lower than the thickness of the chains $C_{2B}$ and $C_{3B}$. By way of example only, the chain $C_{3I}$ may have a thickness of about 6 mm—in any case, the percentage reduction in thickness with respect to the same angular position with the shoe 320 in the first configuration may depend on different design options, such as curvature of the further arc-shaped side $320_A$ and/or of the further lobe $320_E$, and/or vertical position of the rotation axis O'. This exemplary angular position may substantially represent a maximum rotation in the anticlockwise direction compatible with a correct operation of the shoe 320 in its accompanying function (in fact, a further anticlockwise rotation of the shoe 320 would result, by construction, in an excessive rising of the tip which would hinder the sliding of the chain $C_{3I}$).

Therefore, in the example at issue wherein the contact surface allows supporting and accompanying chains whose thicknesses range from 5 mm to 12.7 mm (see FIGS. 2A-2C and 3A-3B), the shoe 320 in the second mounting configuration (and, hence, the further contact surface) advantageously allows supporting and accompanying chains having thicknesses ranging from 3 mm to 5 mm.

Figure 4A:
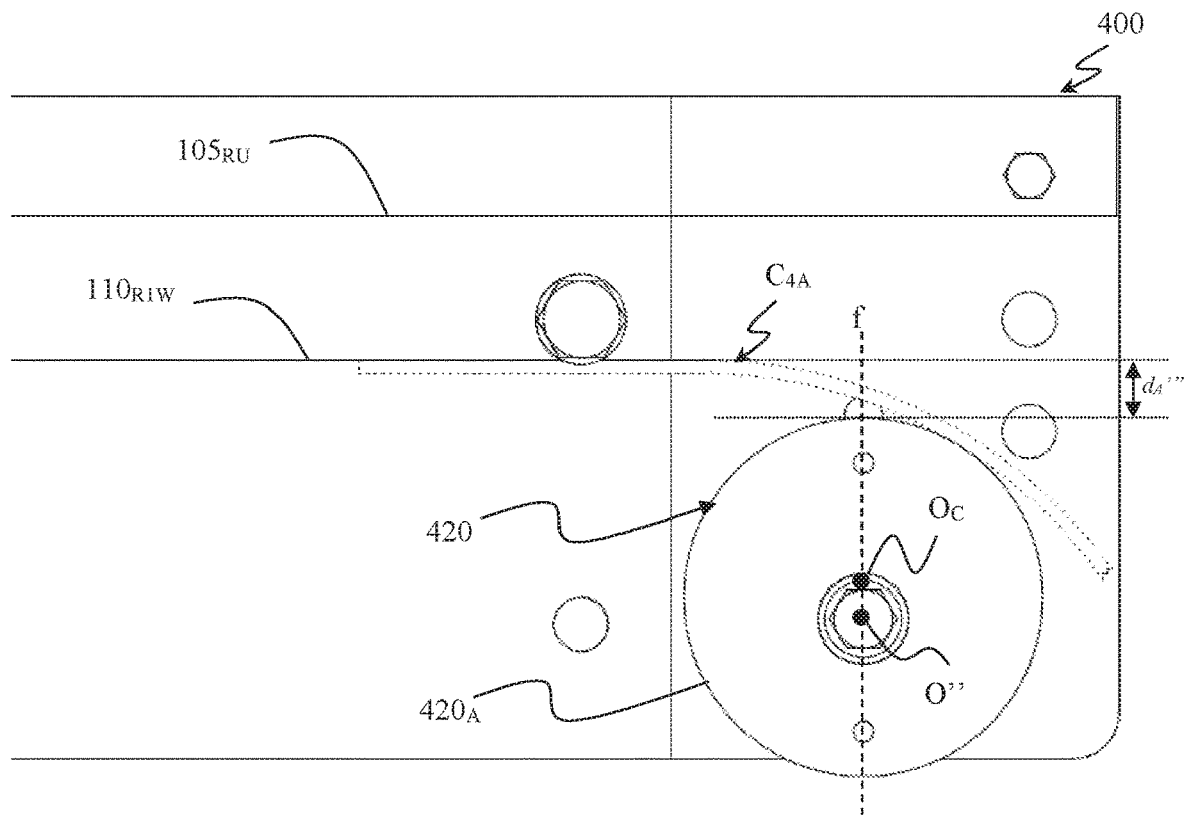
FIGS. 4A, 4B and 4C show side views of a guide structure according to another embodiment of the present invention, in respective angular positions of accompanying means thereof.
Figure 4B:
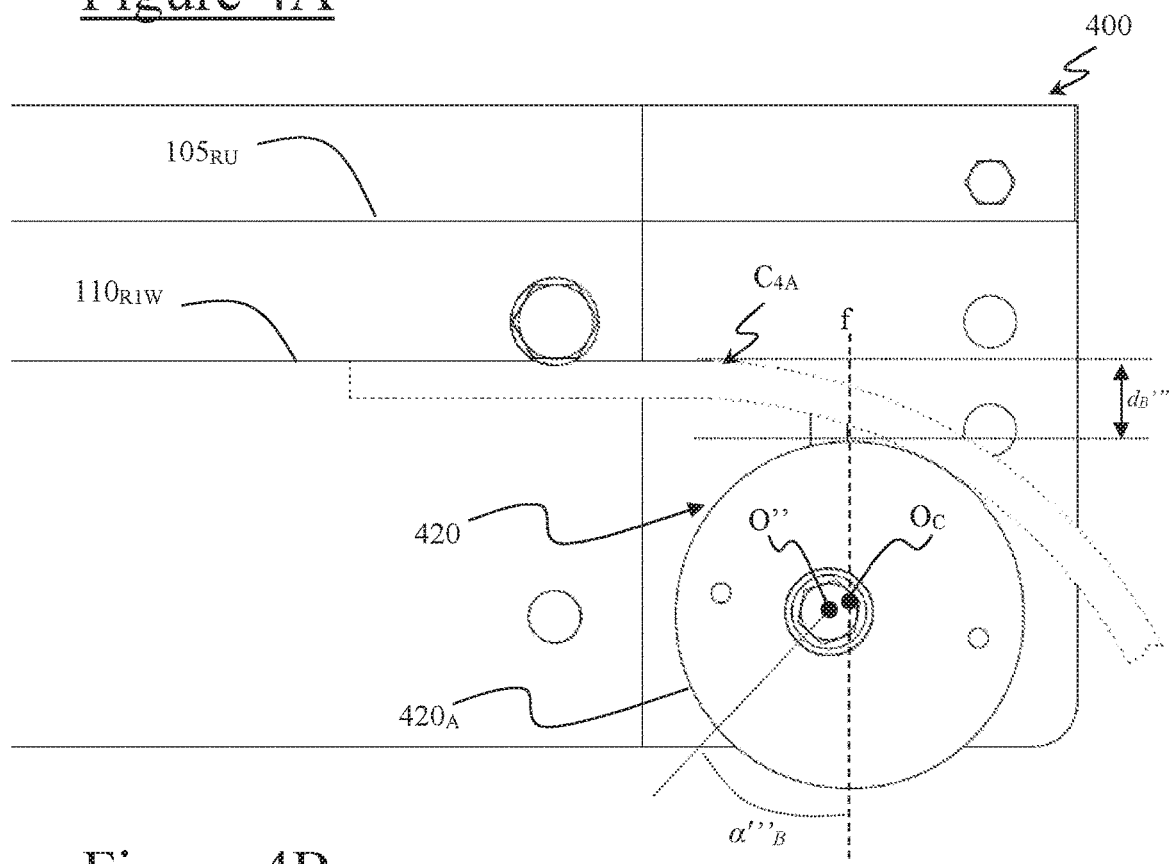
Figure 4C:
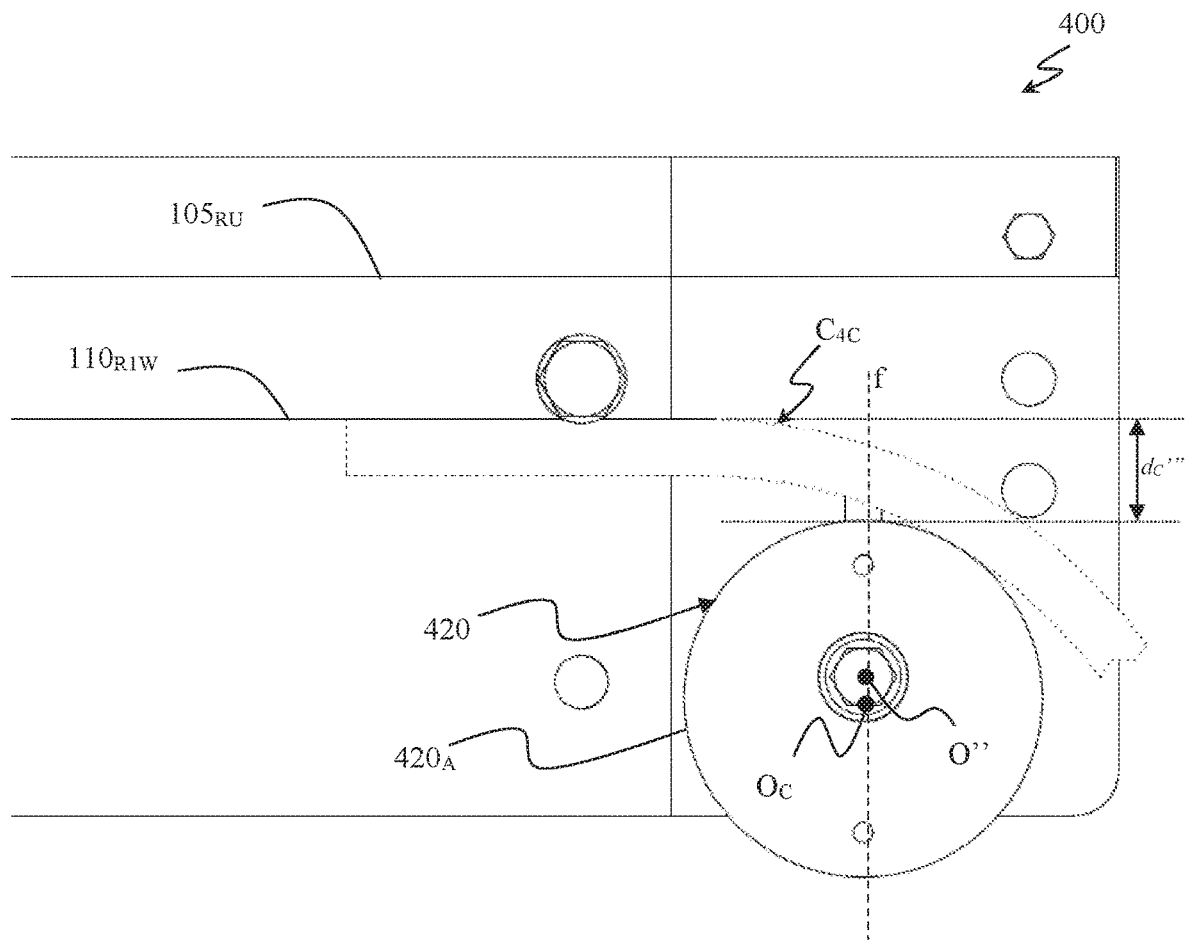

With reference now to FIGS. 4A, 4B and 4C, they show side views of a guide structure 400 according to another embodiment of the present invention, in respective angular positions of accompanying means thereof.

In this exemplary embodiment of the present invention, the accompanying means of the guide structure 400 comprises a cylinder 420, the contact surface being thus a side surface $420_A$ of the cylinder 420. The cylinder 420 is rotatable about an eccentric rotation axis O" being eccentric compared to the cylinder axis $O_C$ (i.e., the axis of symmetry of the cylinder).

In FIGS. 4A, 4B and 4C, the guide structure 400 is illustrated with the cylinder 420 in respective angular positions and with exemplary chains $C_{4A}, C_{4B}, C_{4C}$ resting and sliding on the shoe 420 (wherein, for ease of illustration, the chains $C_{4A}, C_{4B}, C_{4C}$ are shown with a simplified representation).

In an exemplary angular position, illustrated in FIG. 4A, the cylinder axis $O_C$ and the eccentric rotation axis O" are substantially aligned along the vertical direction Y, i.e. the eccentric rotation axis O" is, on a plane parallel to the bases of the cylinder 420, at a rotation angle $\alpha'''_A \simeq 0$ with respect to a plane f parallel to the vertical direction Y and passing for the cylinder axis $O_C$. In this angular position, the minimum distance between the contact surface and the guide channel $115_R$ (i.e., between the contact surface and a plane on which the lower walls $110_{R1W}, 110_{R2W}$ of the rails $110_{R1}$, $110_{R2}$ lay) has a distance value $d_A'''$. As should be readily understood, in this first exemplary angular position, the cylinder 420 according to this embodiment is able to support and accompany into the guide channel $115_R$ a chain $C_{4A}$ with a thickness that depends on an actual positioning of the cylinder 420 along the vertical direction Y (i.e., its vertical position), and, once the vertical position has been chosen, on the size of the cylinder 420 (i.e., its diameter). By way of example only, and for only purposes of comparison with respect to the chains $C_{4B}$ and $C_{4C}$ respectively illustrated in FIGS. 4B and 4C, the chain $C_{4A}$ may have a thickness of about 5 mm.

In another exemplary angular position, illustrated in FIG. 4B, the eccentric rotation axis O" is, on the plane parallel to the bases of the cylinder 420, at a rotation angle $\alpha'''_B$ with respect to the plane f (in the example at issue, $\alpha'''_B \simeq 95°$ in the clockwise direction from the angular position of the eccentric rotation axis O" illustrated in FIG. 4A) that determines, with respect to the vertical direction Y, a lowering of the cylinder 420. This determines that the minimum distance between the contact surface and the guide channel $115_R$ has a distance value $d_B'''$ that is higher than the distance value $d_A'''$, which allows the cylinder 420 to support and accompany into the guide channel $115_R$ a chain $C_{4B}$ with thickness higher than the thickness of the chain $C_{4A}$. By way of example only, the chain $C_{4B}$ may have a thickness of about 8.7 mm—in any case, the percentage increase in thickness with respect to the exemplary angular position having rotation angle $\alpha'''_A \simeq 0$ may depend on different design options, such as vertical position and diameter of the cylinder 420.

In another exemplary angular position, illustrated in FIG. 4C, the eccentric rotation axis O" is, on the plane parallel to the bases of the cylinder 420, at a rotation angle $\alpha''_C$ with respect to the plane f (in the example at issue, $\alpha''_B \simeq 180°$ in the clockwise direction from the position of the eccentric rotation axis O" illustrated in FIG. 4A) that determines, with respect to the vertical direction Y, a further lowering of the cylinder 420. This determines that the minimum distance between the contact surface and the guide channel $115_R$ has a distance value $d_C'''$ that is lower than the distance value $d_B'''$, which allows the cylinder 420 to support and accompany into the guide channel $115_R$ a chain $C_{4C}$ with thickness higher than the thickness of the chain $C_{4B}$. By way of example only, the chain $C_{4C}$ may have a thickness of about 12.7 mm—in any case, the percentage increase in thickness with respect to the exemplary angular position having rotation angle $\alpha'''_B \simeq 95°$ may depend on different design options, such as vertical position and diameter of the cylinder 420.

As should be readily understood, due to the symmetry of the cylinder 420, a further rotation of the cylinder (about the eccentric rotation axis O") in the clockwise direction from the position of the eccentric rotation axis O" illustrated in FIG. 4C determines a progressive raising of the cylinder 420 until reaching the angular position of FIG. 4A (i.e., rotation angle of 360°).

The angular positions at the rotation angles $\alpha'''_A$, $\alpha'''_B$ and $\alpha'''_C$ (and at any other rotation angle between the rotation angle $\alpha'''_A$ and the rotation angle $\alpha'''_C$) are obtained by rotation of the cylinder 420 about the eccentric rotation axis O", which also identifies or is defined by the position of the adjusting and fixing means of the guide structure 400 with respect to the cylinder 420.

Figure 4D:
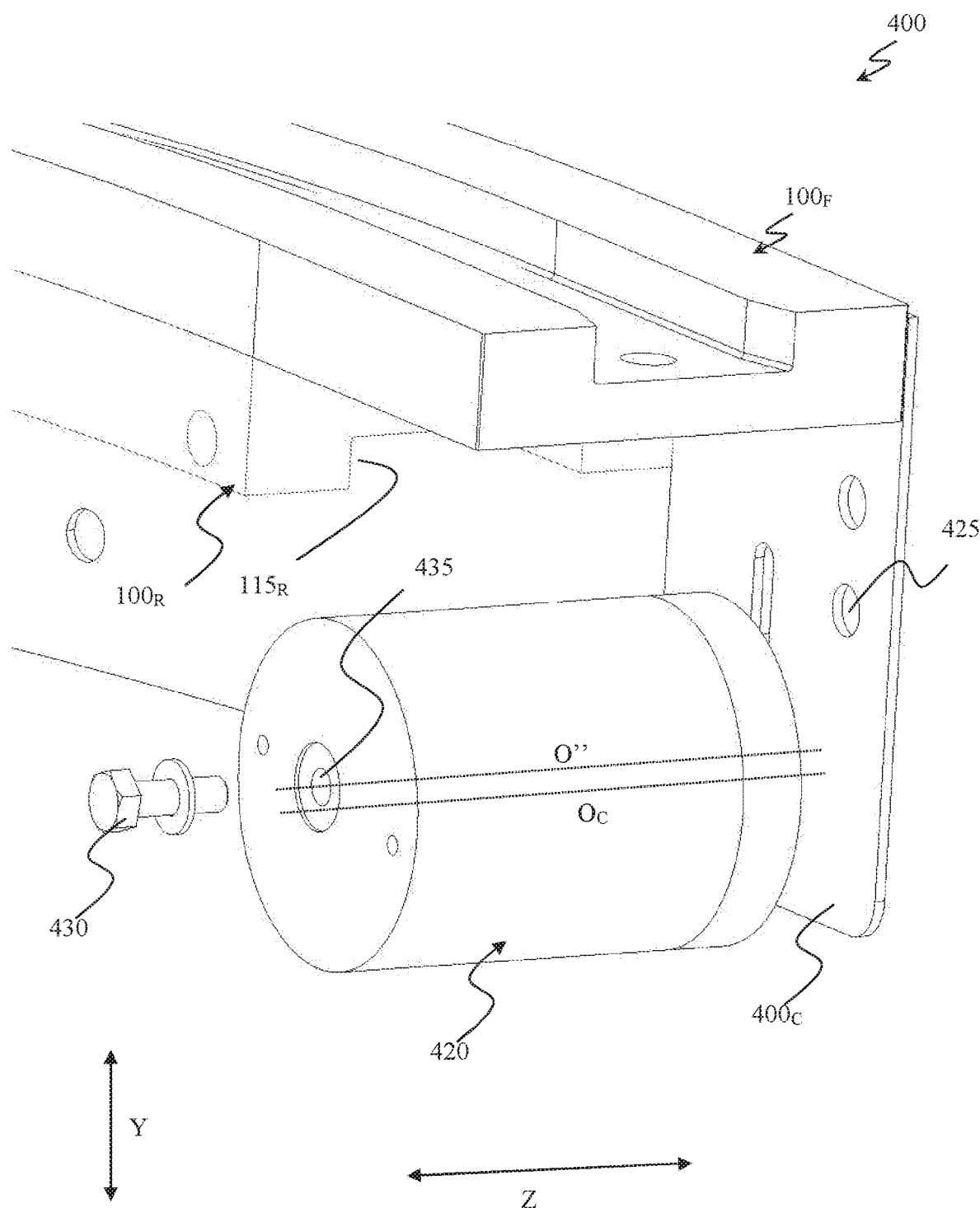
FIGS. 4D and 4E show perspective and partially exploded views with removed parts of the guide structure of FIGS. 4A, 4B and 4C, wherein both adjusting and fixing means are visible.
Figure 4E:
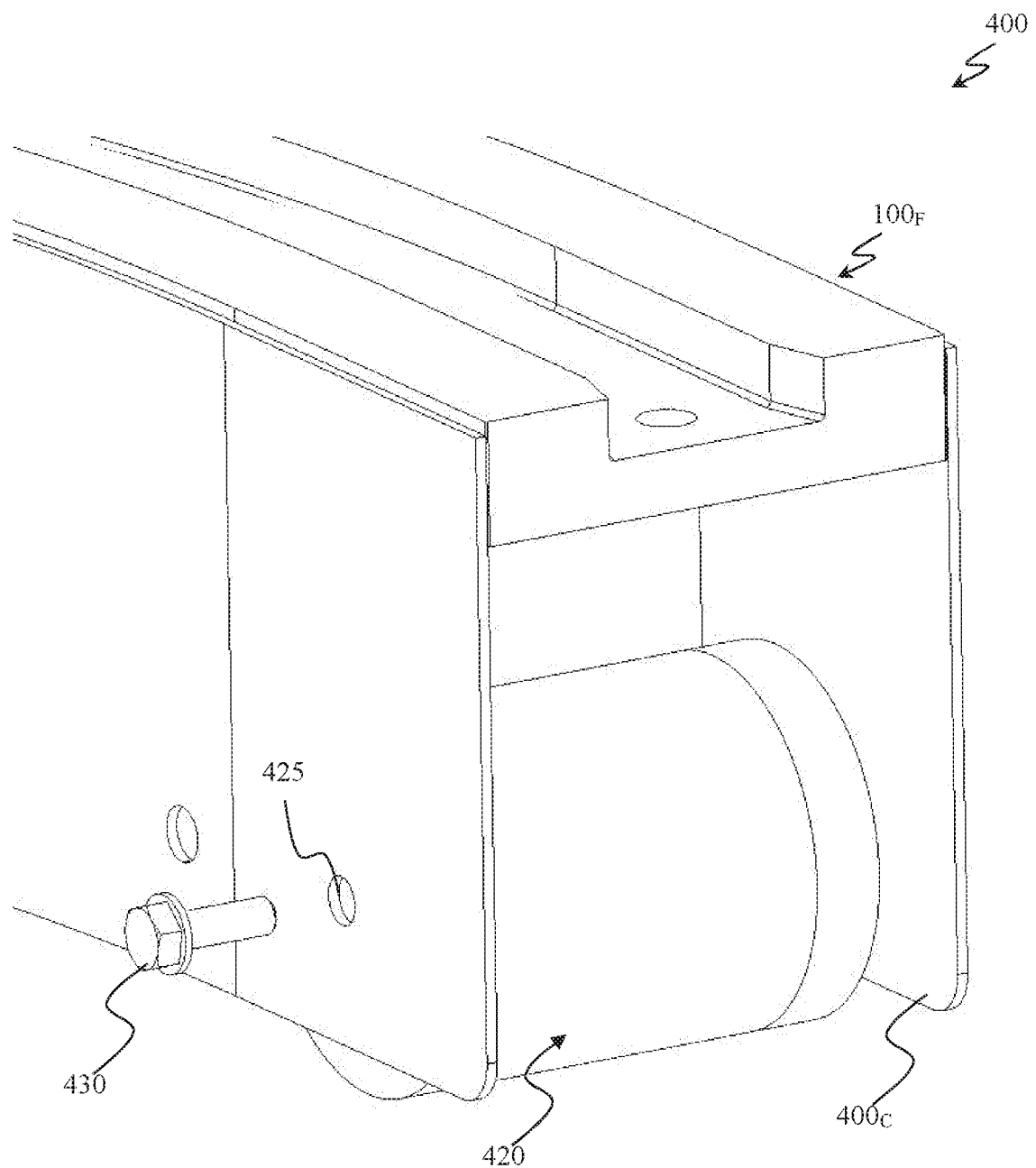

With reference now to FIGS. 4D and 4E, they show perspective and partially exploded views with removed parts of the guide structure 400, wherein both adjusting and fixing means according to an embodiment of the present invention are visible.

The adjusting means preferably comprises two holes (through holes) 425 at respective opposite side walls of the carter $400_C$, and the fixing means comprises screws 430 adapted to be screwed into two threaded holes 435 formed in the cylinder 420 (only one threaded hole 435 being visible in FIG. 4D). The threaded holes 435 are preferably formed from respective side walls of the cylinder 420 that, in operation, face the side walls of the carter $400_C$, and extend inside the shoe 220, along the transversal direction Z (when considering the cylinder 420 in position between the carter side walls), for an extent corresponding to the screw length—as an alternative, not shown, a single through hole may be formed inside the cylinder 420, along the transversal direction Z, such that the cylinder 420 may be kept in the desired angular position by a bolt and nut pair as a fixing means. Therefore, in operation, when positioning the cylinder 420 between the side walls of the carter $400_C$ (with the threaded holes 435 of the cylinder 420 matching respective through holes 425 of the carter $400_C$) and inserting and partially screwing the screws 430 into the through holes 425 of the carter $400_C$ and into the threaded hole 435 of the cylinder 420, the cylinder 420 can be adjusted or oriented or rotated by an operator in the desired angular position depending on the chain to be used. Upon rotating the cylinder 420 in the desired angular position, further screwing of the screws 430 allows the cylinder 420 to be firmly kept in the desired angular position.

Therefore, the vertical position of the cylinder 420 (i.e., its position along the vertical direction Y) can be adjusted by rotation of the cylinder 420 about an eccentric rotation axis O" identified by the threaded holes 435. With respect to the known solutions of guide structures, such as the guide structure 100 discussed in the foregoing, in which the vertical position of the accompanying means is adjusted by means of its vertical sliding along the (vertical) elongated openings 125, the present invention allows achieving a same, or even better, adjusting of the vertical position by means of circular holes formed in the carter 400$_C$ (with the advantages of having circular holes instead of vertically elongated openings that have been also discussed in the foregoing).

Although the embodiments of the present invention discussed above have been presented as particularly advantageous in terms of machinery complexity (due to the absence of vertically elongated openings formed in the carter side walls), the present invention can be also used in, and hence adapted to, conventional and existing guide structures having such vertically elongated openings.

Naturally, in order to satisfy contingent and specific requirements, a person skilled in the art may introduce the present invention many modifications and logical and/or physical changes. More specifically, although the present invention has been described with a certain level of detail with reference to one or more embodiments thereof, it should be understood that various omissions, substitutions and changes in the form and details as well as other embodiments are possible. In particular, various embodiments of the present invention may be put into practice even without the specific details (such as the numerical examples) set forth in the description to provide a more complete understanding thereof; on the contrary, well-known features may be omitted or simplified in order not to obscure the description with unnecessary details. Moreover, it is expressly intended that specific elements described in relation to each embodiment of the present invention may be incorporated in any other embodiment as a normal design choice.

Similar considerations apply if the guide structure comprises equivalent components. In any case, any component may be separated into more elements, or two or more components may be combined into a single element; furthermore, each component may be replicated to support the execution of the corresponding operations in parallel. It is also pointed out that (unless otherwise specified) any interaction between different components generally does not need to be continuous, and may be direct or indirect through one or more intermediaries.

I claim:

1. Guide structure for a chain for an article conveyor, said guide structure comprising:
    a guide for, in use, guiding a chain along a first direction being a direction of movement of the chain, wherein the guide comprises a first surface and at least two rails, each one extending along a second direction orthogonal to the first direction, each pair of rails delimiting, along a third direction orthogonal to the first and second directions, a respective guide channel for, in use, at least partly accommodating the chain,
    an accompanying means for supporting the chain and accompanying it into the guide channel, wherein the accompanying means comprises a contact surface adapted to be in contact with the chain while the chain is accompanied into the guide channel,
    a fixing means for keeping the accompanying means in fixed position with respect to the guide, and
    an adjusting means for adjusting an angular position of the accompanying means along the second direction,
    wherein the adjusting means is adapted to adjust the angular position of the accompanying means with respect to the guide in at least a first and a second angular positions, wherein in the first angular position the minimum distance of the contact surface from the first surface along the second direction has a first distance value, and in the second angular position the minimum distance of the contact surface from the first surface along the second direction has a second distance value, the second distance value being different from the first distance value, and the fixing means keeping the accompanying means in the adjusted angular position.

2. The guide structure according to claim 1, wherein the first surface, in use, faces the chain, and wherein the guide has a second surface opposite the first surface, and wherein the at least two rails each extend from the first surface to a third surface between the first and second surfaces.

3. The guide structure according to claim 1, wherein the contact surface has a rounded profile.

4. The guide structure according to claim 1, wherein the accompanying means comprises a further contact surface opposite to said contact surface, and wherein the accompanying means can be arranged in a first mounting configuration in which the contact surface faces, in operation, the chain, or in a second mounting configuration in which the further contact surface faces, in operation, the chain.

5. The guide structure according to claim 4, wherein the further contact surface has a rounded profile.

6. The guide structure according to claim 5, wherein the contact surface and the further contact surface define a substantially pear shaped cam profile of the accompanying means.

7. The guide structure according to claim 4, wherein the accompanying means is rotatable about a rotation axis parallel to the third direction, and wherein the rotation axis has, along the second direction, a first distance from the contact surface and a second distance from the further contact surface, the first distance being different from the second distance whereby, when the accompanying means is arranged in the second mounting configuration, the rotation of the accompanying means between said first and second angular positions determines, respectively, first and second further distances values of the minimum distance between the further contact surface and the first surface along the second direction, the first and second further distance values being different from the first and second distance values, respectively.

8. The guide structure according to claim 1, wherein the accompanying means comprises a cylinder, the accompanying means being rotatable between the first and second angular positions by rotation of the cylinder about an eccentric rotation axis being eccentric compared to the cylinder axis.

9. The guide structure according to claim 1, further comprising a protective casing having two opposite side walls within which the guide is provided, the adjusting means comprising a pair of circular through holes each one formed at a respective wall of the protective casing.

10. The guide structure according to claim 1, wherein the adjusting means is configured to adjust the angular position of the accompanying means to accommodate a chain having a thickness between 3 millimeters and 13 millimeters.

11. Guide structure for a chain for an article conveyor, said guide structure comprising:
- a guide for, in use, guiding a chain along a first direction, the first direction being a direction of movement of the chain, wherein the guide comprises a guide channel having a first surface extending in the first direction for accommodating the chain,
- an accompanying means for supporting the chain and accompanying it into the guide channel, wherein the accompanying means comprises a contact surface adapted to be in contact with the chain while the chain is accompanied into the guide channel,
- a fixing means for keeping the accompanying means in fixed position with respect to the guide, and
- an adjusting means having an axis of rotation, the adjusting means configured to adjust an angular position of the accompanying means along a second direction orthogonal to the first direction when the accompanying means is rotated about the axis of rotation,
- wherein the adjusting means is adapted to adjust the angular position of the accompanying means with respect to the guide in at least a first and a second angular positions, wherein in the first angular position the minimum distance of the contact surface from the first surface along the second direction has a first distance value, and in the second angular position the minimum distance of the contact surface from the first surface along the second direction has a second distance value, the second distance value being different from the first distance value, and the fixing means keeping the accompanying means in the adjusted angular position.

12. The guide structure according to claim 11, wherein the guide comprises at least two rails, each one extending along the second direction, where the guide has a first surface that, in use, faces the chain, and a second surface opposite the first surface, and wherein the at least two rails each extend from the first surface to a third surface between the first and second surfaces.

13. The guide structure according to claim 11, wherein the contact surface has a rounded profile.

14. The guide structure according to claim 11, wherein the accompanying means comprises a further contact surface opposite to said contact surface, and wherein the accompanying means can be arranged in a first mounting configuration in which the contact surface faces, in operation, the chain, or in a second mounting configuration in which the further contact surface faces, in operation, the chain.

15. The guide structure according to claim 14, wherein the further contact surface has a rounded profile.

16. The guide structure according to claim 15, wherein the contact surface and the further contact surface define a substantially pear shaped cam profile of the accompanying means.

17. The guide structure according to claim 14, wherein the axis of rotation is parallel to a third direction, orthogonal to the first and second directions, and wherein the axis of rotation has, along the second direction, a first distance from the contact surface and a second distance from the further contact surface, the first distance being different from the second distance whereby, when the accompanying means is arranged in the second mounting configuration, the rotation of the accompanying means between said first and second angular positions determines, respectively, first and second further distances values of the minimum distance between the further contact surface and the first surface along the second direction, the first and second further distance values being different from the first and second distance values, respectively.

18. The guide structure according to claim 11, wherein the accompanying means comprises a cylinder, the accompanying means being rotatable between the first and second angular positions by rotation of the cylinder about an eccentric rotation axis being eccentric compared to the cylinder axis.

19. The guide structure according to claim 11, further comprising a protective casing having two opposite side walls within which the guide is provided, the adjusting means comprising a pair of circular through holes each one formed at a respective wall of the protective casing.

20. The guide structure according to claim 11, wherein the adjusting means is configured to adjust the angular position of the accompanying means to accommodate a chain having a thickness between 3 millimeters and 13 millimeters.

* * * * *

UNITED STATES PATENT AND TRADEMARK OFFICE
CERTIFICATE OF CORRECTION

PATENT NO. : 10,577,185 B2  
APPLICATION NO. : 16/253758  
DATED : March 3, 2020  
INVENTOR(S) : Andrea Andreoli Page 1 of 1

It is certified that error appears in the above-identified patent and that said Letters Patent is hereby corrected as shown below:

In the Specification

Column 1, Line 46, "opening" should be --openings--.

Column 1, Line 62, "petitioning" should be --positioning--.

Column 5, Line 34, "along n" should be --along a--.

Column 6, Line 26, "magnet" should be --magnets--.

Column 7, Line 44, "tor" should be --for--.

Column 8, Line 27, "220," should be --$220_A$--.

Column 9, Line 36, "determine" should be --determines--.

Column 10, Line 33, "$200_D$" should be --$200_C$--.

Column 11, Line 36, "$220_B$" should be --$220_E$--.

Signed and Sealed this  
Ninth Day of June, 2020

Andrei Iancu  
*Director of the United States Patent and Trademark Office*